US005993089A

United States Patent [19]
Burrell, IV

[11] Patent Number: 5,993,089
[45] Date of Patent: Nov. 30, 1999

[54] 8-BIT BINARY CODE FOR USE AS AN 8-DOT BRAILLE ARRANGEMENT AND DATA ENTRY SYSTEM AND METHOD FOR 8-KEY CHORDIC BINARY KEYBOARDS

[76] Inventor: James William Burrell, IV, P.O. Box 3822, Union, N.J. 07083

[21] Appl. No.: 08/792,798

[22] Filed: Feb. 3, 1997

[51] Int. Cl.⁶ .............................. B41J 5/06; H03K 17/94
[52] U.S. Cl. ........................ 400/100; 400/485; 400/486; 341/22; 364/709.15; 364/709.16; 364/189
[58] Field of Search ..................................... 400/472, 477, 400/479, 479.1, 479.2, 482, 483, 484, 485, 486, 488, 489; 341/22, 23, 21; 364/709.12, 709.15, 709.16, 189

[56] References Cited

U.S. PATENT DOCUMENTS

| | | |
|---|---|---|
| 329,675 | 11/1885 | Perkins . |
| 477,062 | 6/1892 | Orndorff . |
| 506,718 | 10/1893 | Orndorff . |
| 578,785 | 3/1897 | Swindler . |
| 1,293,023 | 2/1919 | Bryan et al. . |
| 1,409,386 | 3/1922 | McQuarrie . |
| 1,487,115 | 3/1924 | McQuarrie . |
| 1,733,605 | 10/1929 | Jones . |
| 1,771,953 | 7/1930 | Conklin . |
| 1,932,914 | 10/1933 | Shelton et al. . |
| 1,936,089 | 11/1933 | Jacquerod . |
| 1,998,063 | 4/1935 | Wessborg . |
| 2,012,924 | 8/1935 | Conklin . |
| 2,028,516 | 1/1936 | Miller et al. . |
| 2,031,017 | 2/1936 | Tevis . |
| 2,040,248 | 5/1936 | Dvorak et al. . |
| 2,150,364 | 3/1939 | Dudley . |
| 2,187,592 | 1/1940 | Paul . |
| 2,189,023 | 2/1940 | Ayres . |
| 2,190,752 | 2/1940 | Brown . |
| 2,192,594 | 3/1940 | Brand et al. . |
| 2,282,102 | 5/1942 | Tunick . |
| 2,312,138 | 2/1943 | Watson . |

(List continued on next page.)

FOREIGN PATENT DOCUMENTS 296311  8/1988  Russian Federation ............... 400/479

OTHER PUBLICATIONS

"Easy–To–Learn Programmable Keyboard", Bacon, IBM Technical Disclosure Bulletin, vol. 24. No. 5. Oct. 1981.
"Digital X" Typewriter Keyboard, IBM Technical Disclosure Bulletin, vol. 18, No. 12 pp. 4187–4190, May 1996.
I.B.M. Technical Disclosure Bulletin, vol. 18 No. 12, May 1976 "Digital X Typewriter Keyboard".

*Primary Examiner*—Eugene Eickholt
*Attorney, Agent, or Firm*—Ezra Sutton

[57] ABSTRACT

An alphanumeric data entry system for chordic keyboards permits the entry of vowels with the thumb and digits of the left hand and the entry of consonants with the thumb and digits of the right hand in combination with vowel chords from the left hand. Only the thumb, index, middle and ring digits of the left and right hands, respectively, are necessary for manipulation of 2 four-key sets. The keyboard can either be a conventional side-by-side keyboard or, alternatively, an 8 dot braille keyboard in which the two sets are arranged in two rows in a substantially parallel relationship to each other. The number mode is initiated by depressing all four digits of the right hand and then entering numbers beginning with the ring digit of the left hand as the lowest integer and proceeding in a reverse binary fashion from left to right with the numbers 0 through 9 entered by the left hand. The system can switch functions by depressing the index, middle and ring digits of the right hand and then entering the desired function code with the digits of the left hand. Some of the other functions possible are common math operators, containment chords, movement chords, operating chords, monetary and graphic chords, foreign language chords, etc. Because of the left to right nature of the data entry, the system is relatively easy to learn and fast to use. It is especially suited for handicapped and sight disabled individuals as a substitute for braille.

22 Claims, 37 Drawing Sheets

U.S. PATENT DOCUMENTS

| | | | |
|---|---|---|---|
| 2,390,414 | 12/1945 | Ayres et al. . | |
| 2,428,605 | 10/1947 | Ayres . | |
| 2,520,142 | 8/1950 | Herbst . | |
| 2,532,228 | 11/1950 | Hesh | 400/485 |
| 2,581,665 | 1/1952 | Jarmann . | |
| 2,616,198 | 11/1952 | Sewell . | |
| 2,634,052 | 4/1953 | Bloch . | |
| 2,641,769 | 6/1953 | Robinson . | |
| 2,718,633 | 9/1955 | Fennessy . | |
| 2,823,468 | 2/1958 | Mora . | |
| 2,850,812 | 9/1958 | Mannheimer . | |
| 2,972,140 | 2/1961 | Hirsch . | |
| 3,021,611 | 2/1962 | Goodell et al. . | |
| 3,022,878 | 2/1962 | Seibel et al. . | |
| 3,102,254 | 8/1963 | Levy . | |
| 3,166,856 | 1/1965 | Uttal . | |
| 3,184,554 | 5/1965 | Meacham et al. . | |
| 3,197,889 | 8/1965 | Micropoulou . | |
| 3,225,883 | 12/1965 | Ayres . | |
| 3,234,664 | 2/1966 | Yaeger . | |
| 3,241,115 | 3/1966 | Maling . | |
| 3,277,587 | 10/1966 | Holcombe . | |
| 3,369,643 | 2/1968 | Avgerinos . | |
| 3,375,497 | 3/1968 | Jones et al. . | |
| 3,381,276 | 4/1968 | James . | |
| 3,428,747 | 2/1969 | Alferieff . | |
| 3,466,647 | 9/1969 | Guzak . | |
| 3,507,376 | 4/1970 | Kafafian . | |
| 3,526,892 | 9/1970 | Bartlett et al. . | |
| 3,582,554 | 6/1971 | Le Blang . | |
| 3,633,724 | 1/1972 | Samuel . | |
| 3,675,513 | 7/1972 | Flanagen et al. . | |
| 3,772,597 | 11/1973 | Stover . | |
| 3,781,802 | 12/1973 | Kafafian . | |
| 3,798,599 | 3/1974 | Kafafian . | |
| 3,818,448 | 6/1974 | Wilkins . | |
| 3,831,147 | 8/1974 | Kafafian . | |
| 3,831,296 | 8/1974 | Hagle . | |
| 3,833,765 | 9/1974 | Hilborn | 400/472 |
| 3,879,722 | 4/1975 | Knowlton . | |
| 3,929,216 | 12/1975 | Einbinder . | |
| 3,945,482 | 3/1976 | Einbinder . | |
| 3,967,273 | 6/1976 | Knowlton . | |
| 3,970,185 | 7/1976 | Shelton . | |
| 3,980,823 | 9/1976 | Howard . | |
| 3,982,236 | 9/1976 | Kafafian . | |
| 4,037,200 | 7/1977 | Cranmer | 400/479 |
| 4,042,777 | 8/1977 | Bequaert et al. . | |
| 4,067,431 | 1/1978 | Whitaker | 400/485 |
| 4,074,444 | 2/1978 | Laenger, Sr. et al. . | |
| 4,132,976 | 1/1979 | Siegal . | |
| 4,159,471 | 6/1979 | Whitaker . | |
| 4,185,282 | 1/1980 | Pick . | |
| 4,333,097 | 6/1982 | Buric et al. . | |
| 4,350,055 | 9/1982 | Pinomäki . | |
| 4,360,892 | 11/1982 | Endfield . | |
| 4,381,502 | 4/1983 | Prame | 400/100 |
| 4,467,321 | 8/1984 | Volnak . | |
| 4,494,109 | 1/1985 | Berwin | 400/479.2 |
| 4,516,939 | 5/1985 | Crimmins, Jr. | 400/492 |
| 4,655,621 | 4/1987 | Holden | 400/100 |
| 4,680,572 | 7/1987 | Meguire et al. . | |
| 4,775,255 | 10/1988 | Langley | 400/100 |
| 4,791,408 | 12/1988 | Heusinkveld | 400/479 |
| 4,804,279 | 2/1989 | Berkelmans et al. . | |
| 4,836,700 | 6/1989 | Jensen | 400/489 |
| 4,911,565 | 3/1990 | Ryan | 400/485 |
| 4,913,573 | 4/1990 | Retter | 400/485 |
| 5,010,799 | 4/1991 | Tanaka et al. | 84/627 |
| 5,087,910 | 2/1992 | Guyot-Sionnest | 400/489 |
| 5,189,416 | 2/1993 | Zestes | 400/100 |
| 5,217,311 | 6/1993 | Freedman | 400/482 |
| 5,281,966 | 1/1994 | Walsh | 400/489 |
| 5,341,133 | 8/1994 | Savoy | 341/22 |
| 5,361,083 | 11/1994 | Pollack | 400/485 |
| 5,459,458 | 10/1995 | Richardson et al. . | |
| 5,486,058 | 1/1996 | Allen | 400/489 |
| 5,515,305 | 5/1996 | Register et al. | 400/486 |
| 5,642,108 | 6/1997 | Gopher et al. | 400/486 |
| 5,793,312 | 8/1998 | Tsubai | 400/485 |

INPUT DIGIT TABLE

| HAND | DIGIT | ABBREVIATION | OCTAL # |
|---|---|---|---|
| LEFT | Ring Finger | LR | 1 |
| | Middle Finger | LM | 2 |
| | Index Finger | LI | 4 |
| | Thumb | LT | 8 |
| RIGHT | Thumb | RT | 16 |
| | Index Finger | RI | 32 |
| | Middle Finger | RM | 64 |
| | Ring Finger | RR | 128 |

FINGER-OCTAL NUMBER TABLE

```
--------                                       ----------
LR | 1                                         128 | RR
--------                                       ----------
     --------                              ---------
     LM | 2                                64 | RM
     --------                              ---------
          --------                    ---------
          LI | 4                      32 | RI
          --------                    ---------

--------    ---------
         LT | 8      16 | RT
         --------    ---------
```

8-DOT BRAILLE ORGANIZATION

```
(8)  LT  .  .  RT  (16)
(4)  LI  .  .  RI  (32)
(2)  LM  .  .  RM  (64)
(1)  LR  .  .  RR  (128)
```

FIG. 2A
ALPHABET CHORDS

| VOWEL | REVERSE BINARY # | OCTAL # | BINARY # | KEYBOARD ENTRY |
|---|---|---|---|---|
| a | 0001 0000 | 8 | 16 | LT |
| e | 0010 0000 | 4 | 32 | LI |
| i | 0100 0000 | 2 | 64 | LM |
| o | 1000 0000 | 1 | 128 | LR |
| u | 0110 0000 | 6 | 96 | LMI |
| y | 1001 0000 | 9 | 144 | LRT |

FIG. 2B
VOWEL CONSONANT GROUPINGS

| a | e | i | | o | | u | y |
|---|---|---|---|---|---|---|---|
| b | f | j | l | p | r | v | z |
| c | g | k | m | q | s | w | |
| d | h | | n | | t | x | |

FIG. 2C
LOWER CASE LETTER TABLE

| LETTER | REVERSE BINARY # | OCTAL # | BINARY # | KEYBOARD ENTRY | |
|---|---|---|---|---|---|
| a | 0001 0000 | 8 | 16 | LT | |
| b | 0001 0100 | 40 | 20 | LT | RI |
| c | 0001 0010 | 72 | 18 | LT | RM |
| d | 0001 0001 | 136 | 17 | LT | RR |
| e | 0010 0000 | 4 | 32 | LI | |
| f | 0010 0100 | 36 | 36 | LI | RI |
| g | 0010 0010 | 68 | 34 | LI | RM |
| h | 0010 0001 | 132 | 33 | LI | RR |
| i | 0100 0000 | 2 | 64 | LM | |
| j | 0100 0110 | 98 | 70 | LM | RIM |
| k | 0100 0011 | 194 | 67 | LM | RMR |
| l | 0100 0100 | 34 | 68 | LM | RI |
| m | 0100 0010 | 66 | 66 | LM | RM |
| n | 0100 0001 | 130 | 65 | LM | RR |
| o | 1000 0000 | 1 | 128 | LR | |
| p | 1000 0110 | 97 | 134 | LR | RIM |
| q | 1000 0011 | 193 | 131 | LR | RMR |
| r | 1000 0100 | 33 | 132 | LR | RI |
| s | 1000 0010 | 65 | 130 | LR | RM |
| t | 1000 0001 | 129 | 129 | LR | RR |
| u | 0110 0000 | 6 | 96 | LMI | |
| v | 0110 0100 | 38 | 100 | LMI | RI |
| w | 0110 0010 | 70 | 98 | LMI | RM |
| x | 0110 0001 | 134 | 97 | LMI | RR |
| y | 1001 0000 | 9 | 144 | LRT | |
| z | 1001 0100 | 41 | 148 | LRT | RI |

FIG. 2D

UPPER CASE LETTER TABLE

| LETTER | REVERSE BINARY # | OCTAL # | BINARY # | KEYBOARD ENTRY | |
|---|---|---|---|---|---|
| Sp | 0000 1000 | 16 | 8 | | RT |
| A | 0001 1000 | 24 | 24 | LT | RT |
| B | 0001 1100 | 56 | 28 | LT | RTI |
| C | 0001 1010 | 88 | 26 | LT | RTM |
| D | 0001 1001 | 152 | 25 | LT | RTR |
| E | 0010 1000 | 20 | 40 | LI | RT |
| F | 0010 1100 | 52 | 44 | LI | RTI |
| G | 0010 1010 | 84 | 42 | LI | RTM |
| H | 0010 1001 | 148 | 41 | LI | RTR |
| I | 0100 1000 | 18 | 72 | LM | RT |
| J | 0100 1110 | 114 | 78 | LM | RTIM |
| K | 0100 1011 | 210 | 75 | LM | RTMR |
| L | 0100 1100 | 50 | 76 | LM | RTI |
| M | 0100 1010 | 82 | 74 | LM | RTM |
| N | 0100 1001 | 146 | 73 | LM | RTR |
| O | 1000 1000 | 17 | 136 | LR | RT |
| P | 1000 1110 | 113 | 142 | LR | RTIM |
| Q | 1000 1011 | 209 | 139 | LR | RTMR |
| R | 1000 1100 | 49 | 140 | LR | RTI |
| S | 1000 1010 | 81 | 138 | LR | RTM |
| T | 1000 1001 | 145 | 137 | LR | RTR |
| U | 0110 1000 | 22 | 104 | LMI | RT |
| V | 0110 1100 | 54 | 108 | LMI | RTI |
| W | 0110 1010 | 86 | 106 | LMI | RTM |
| X | 0110 1001 | 150 | 105 | LMI | RTR |
| Y | 1001 1000 | 25 | 152 | LRT | RT |
| Z | 1001 1100 | 57 | 156 | LRT | RTI |

PUNCTUATION

| | | | | | |
|---|---|---|---|---|---|
| . | 0000 0100 | 32 | 4 | | RI |
| , | 0000 0001 | 128 | 1 | | RR |
| ? | 0000 1110 | 112 | 14 | | RTIM |
| ! | 0000 0010 | 64 | 2 | | RM |
| : | 0000 0110 | 96 | 6 | | RIM |
| ; | 0000 0101 | 160 | 5 | | RIR |
| ' | 0000 1001 | 144 | 9 | | RTR |
| " | 0000 1101 | 176 | 13 | | RTIR |

FIG. 2E

NUMBER CHORD TABLE

| NUMBER | REVERSE BINARY # | OCTAL # | BINARY # | KEYBOARD ENTRY | |
|---|---|---|---|---|---|
| 0 | 0000 1111 | 240 | 15 | | RTIMR |
| 1 | 1000 1111 | 241 | 143 | LR | RTIMR |
| 2 | 0100 1111 | 242 | 79 | LM | RTIMR |
| 3 | 1100 1111 | 243 | 207 | LRM | RTIMR |
| 4 | 0010 1111 | 244 | 47 | LI | RTIMR |
| 5 | 1010 1111 | 245 | 175 | LRI | RTIMR |
| 6 | 0110 1111 | 246 | 111 | LMI | RTIMR |
| 7 | 1110 1111 | 247 | 239 | LRMI | RTIMR |
| 8 | 0001 1111 | 248 | 31 | LT | RTIMR |
| 9 | 1001 1111 | 249 | 159 | LRT | RTIMR |

FIG. 2F
COMMON MATH FUNCTION CHORD TABLE

| MATH FUNCTION | | REVERSE BINARY # | OCTAL # | BINARY # | KEYBOARD ENTRY | |
|---|---|---|---|---|---|---|
| + | 10 | 0101 1111 | 250 | 95 | LMT | RTIMR |
| x | 11 | 1101 1111 | 251 | 223 | LRMT | RTIMR |
| - | 12 | 0011 1111 | 252 | 63 | LIT | RTIMR |
| : | 13 | 1011 1111 | 253 | 191 | LRIT | RTIMR |
| = | 14 | 0111 1111 | 254 | 127 | LMIT | RTIMR |

FIG. 2G
FUNCTION CHORD TABLE

| FUNCTION # | REVERSE BINARY # | OCTAL # | BINARY # | KEYBOARD ENTRY | |
|---|---|---|---|---|---|
| F1 | 1000 0111 | 225 | 135 | LR | RIMR |
| F2 | 0100 0111 | 226 | 71 | LM | RIMR |
| F3 | 1100 0111 | 227 | 199 | LRM | RIMR |
| F4 | 0010 0111 | 228 | 39 | LI | RIMR |
| F5 | 1010 0111 | 229 | 167 | LRI | RIMR |
| F6 | 0110 0111 | 230 | 103 | LMI | RIMR |
| F7 | 1110 0111 | 231 | 231 | LRMI | RIMR |
| F8 | 0001 0111 | 232 | 23 | LT | RIMR |
| F9 | 1001 0111 | 233 | 151 | LRT | RIMR |
| F10 | 0101 0111 | 234 | 87 | LMT | RIMR |
| F11 | 1101 0111 | 235 | 215 | LRMT | RIMR |
| F12 | 0011 0111 | 236 | 55 | LIT | RIMR |
| F13 | 1011 0111 | 237 | 183 | LRIT | RIMR |
| F14 | 0111 0111 | 238 | 119 | LMIT | RIMR |
| F15 | 1111 0111 | 239 | 247 | LRMIT | RIMR |

FIG. 2H
CONTAINMENT CHORD TABLE

| CONTAINMENT CHORD | REVERSE BINARY # | OCTAL # | BINARY # | KEYBOARD ENTRY | |
|---|---|---|---|---|---|
| ( | 0101 0000 | 10 | 80 | LMT | |
| ) | 0000 1010 | 80 | 10 | | RTM |
| [ | 1101 0000 | 11 | 208 | LRMT | |
| ] | 0000 1011 | 208 | 11 | | RTMR |
| { | 1011 0001 | 141 | 177 | LRIT | RR |
| } | 1000 1101 | 177 | 141 | LR | RTIR |
| < | 0010 0101 | 164 | 37 | LI | RIR |
| > | 1010 0100 | 37 | 164 | LRI | RI |
| « | 0111 1100 | 62 | 124 | LMIT | RTI |
| » | 0011 1110 | 124 | 62 | LIT | RTIM |

FIG. 2I

MOVEMENT CHORDS

| MOVEMENT CHORD | REVERSE BINARY # | OCTAL # | BINARY # | KEYBOARD ENTRY | |
|---|---|---|---|---|---|
| Home       | 1111 0110 | 111 | 246 | LRMIT | RIM |
| Cursor Up  | 1111 1000 | 31  | 248 | LRMIT | RT  |
| Cursor Down| 1111 0001 | 143 | 241 | LRMIT | RR  |
| Cursor Left| 1111 1100 | 63  | 252 | LRMIT | RTI |
| Cursor Rt  | 1111 0011 | 207 | 243 | LRMIT | RMR |
| Cursor     | 0011 0011 | 204 | 51  | LIT   | RMR |
| Tab Right  | 0000 0011 | 192 | 3   |       | RMR |
| Page Up    | 0111 1000 | 30  | 120 | LMIT  | RT  |
| Page Down  | 0111 0001 | 142 | 113 | LMIT  | RR  |

FIG. 2J-1

OPERATING CHORDS

| OPERATING INSTRUCTION | REVERSE BINARY # | OCTAL # | BINARY # | KEYBOARD ENTRY | |
|---|---|---|---|---|---|
| Backspace         | 1110 0000 | 7  | 224 | LRMI  |     |
| (NO) Neg. Acknowledge | 1011 0000 | 13 | 176 | LRIT  |     |
| (YES) Acknowledge | 0111 0000 | 14 | 112 | LMIT  |     |
| Delete            | 1111 0000 | 15 | 240 | LRMIT |     |
| Space             | 0000 1000 | 16 | 8   |       | RT  |
| Escape            | 1100 1000 | 19 | 200 | LRM   | RT  |
| Data link escape  | 1101 1000 | 27 | 216 | LRMT  | RT  |
| (U)nit Separator  | 1011 1000 | 29 | 184 | LRIT  | RT  |
| Reset             | 1101 0100 | 43 | 212 | LRMT  | RI  |
| GOTO              | 1011 0100 | 45 | 180 | LRIT  | RI  |
| MOVE              | 0111 0100 | 46 | 116 | LMIT  | RI  |
| Control           | 1111 0100 | 47 | 244 | LRMIT | RI  |
| Break             | 0000 1100 | 48 | 12  |       | RTI |
| Form Feed         | 0011 1100 | 60 | 60  | LIT   | RTI |
| (R)ecord Separator| 1011 1100 | 61 | 188 | LRIT  | RTI |
| Horizontal Tab    | 0111 0010 | 78 | 114 | LMIT  | RM  |
| Vertical Tab      | 1111 0010 | 79 | 242 | LRMIT | RM  |
| (S)tart of Heading| 1010 1010 | 85 | 170 | LRI   | RTM |
| (S)tart of Text   | 1110 1010 | 87 | 234 | LRMI  | RTM |
| End of Text       | 1001 1010 | 89 | 154 | LRT   | RTM |
| End of Transmit   | 0101 1010 | 90 | 90  | LMT   | RTM |
| End trans. block  | 1101 1010 | 91 | 218 | LRMT  | RTM |

FIG. 2J-2

| | | | | | | |
|---|---|---|---|---|---|---|
| End of Medium | 0011 | 1010 | 92 | 58 | LIT | RTM |
| (G)roup Separator | 1011 | 1010 | 93 | 186 | LRIT | RTM |
| End | 0111 | 1010 | 94 | 122 | LMIT | RTM |
| Cancel | 1111 | 1010 | 95 | 250 | LRMIT | RTM |
| Print Line | 1010 | 0110 | 101 | 166 | LRI | RIM |
| Copy | 0110 | 0110 | 102 | 102 | LMI | RIM |
| Print | 0101 | 0110 | 106 | 86 | LMT | RIM |
| Print Screen | 0011 | 0110 | 108 | 54 | LIT | RIM |
| HOME | 1111 | 0110 | 111 | 246 | LRMIT | RIM |
| Inquiry | 0010 | 1110 | 116 | 46 | LI | RTIM |
| Line Feed | 0111 | 1110 | 126 | 126 | LMIT | RTIM |
| HELP | 1111 | 1110 | 127 | 254 | LRMIT | RTIM |
| SUBstitution | 1111 | 1001 | 159 | 249 | LRMIT | RTR |
| Synchronous Idle | 1010 | 0101 | 165 | 165 | LRI | RIR |
| Shift Out | 1111 | 0101 | 175 | 245 | LRMIT | RIR |
| Figures Shift | 1100 | 1101 | 179 | 205 | LRM | RTIR |
| Scroll Lock | 1011 | 1101 | 189 | 189 | LRIT | RTIR |
| Shift In | 1111 | 1101 | 191 | 253 | LRMIT | RTIR |
| Alternate Carriage Return | 1111 | 1011 | 223 | 251 | LRMIT | RTMR |
| | 0000 | 0111 | 224 | 7 | | RIMR |
| Insert | 1111 | 1111 | 255 | 255 | LRMIT | RTIMR |

FIG. 2K

FOREIGN VOWELS/CONSONANTS

| FOREIGN TERM | REVERSE BINARY # | OCTAL # | BINARY # | KEYBOARD ENTRY | |
|---|---|---|---|---|---|
| æ | 0011 0000 | 12 | 48 | LIT | |
| Æ | 0011 1000 | 28 | 56 | LIT | RT |
| ñ | 0100 0101 | 162 | 69 | LM | RIR |
| Ñ | 0100 1101 | 178 | 77 | LM | RTIR |
| oe | 1010 0000 | 5 | 116 | LRI | |
| OE | 1010 1000 | 21 | 168 | LRI | RT |
| ç | 0001 0011 | 200 | 19 | LT | RMR |
| Ç | 0001 1011 | 216 | 27 | LT | RTMR |
| ^ | 0010 1011 | 212 | 43 | LI | RTMR |
| â | 1110 1011 | 215 | 235 | LRMI | RTMR |
| ê | 1101 1011 | 219 | 219 | LRMT | RTMR |
| î | 1011 1011 | 221 | 187 | LRIT | RTMR |
| ô | 0111 1011 | 222 | 123 | LMIT | RTMR |
| û | 1001 1011 | 217 | 155 | LRT | RTMR |
| ` | 0010 0011 | 196 | 35 | LI | RMR |
| à | 1110 0011 | 199 | 227 | LRMI | RMR |
| è | 1101 0011 | 203 | 211 | LRMT | RMR |
| ì | 1011 0011 | 205 | 179 | LRIT | RMR |
| ò | 0111 0011 | 206 | 115 | LMIT | RMR |
| ù | 1001 0011 | 201 | 147 | LRT | RMR |
| ´ | 0010 0110 | 100 | 38 | LI | RIM |
| á | 1110 0110 | 103 | 230 | LRMI | RIM |
| é | 1101 0110 | 107 | 214 | LRMT | RIM |
| É | 1101 1110 | 123 | 222 | LRMT | RTIM |
| í | 1011 0110 | 109 | 182 | LRIT | RIM |
| ó | 0111 0110 | 110 | 118 | LMIT | RIM |
| ú | 1001 0110 | 105 | 150 | LRT | RIM |
| ¨ | 0011 0101 | 172 | 53 | LIT | RIR |
| ä | 1110 0101 | 167 | 229 | LRMI | RIR |
| Ä | 1110 1101 | 183 | 237 | LRMI | RTIR |
| ë | 1101 0101 | 171 | 213 | LRMT | RIR |
| ï | 1011 0101 | 173 | 181 | LRIT | RIR |
| ö | 0111 0101 | 174 | 117 | LMIT | RIR |
| Ö | 0111 1101 | 190 | 125 | LMIT | RTIR |
| ü | 1001 0101 | 169 | 149 | LRT | RIR |
| Ü | 1001 1101 | 185 | 157 | LRT | RTIR |
| ÿ | 0110 0101 | 166 | 101 | LMI | RIR |
| ß | 0101 0101 | 170 | 85 | LMT | RIR |

FIG. 2L-1

MONETARY CHORDS

| SYMBOL | | REVERSE BINARY # | OCTAL # | BINARY # | KEYBOARD ENTRY | |
|---|---|---|---|---|---|---|
| * | | 1100 0000 | 3 | 192 | LRM | |
| ¥ | (Y)en | 1100 1000 | 19 | 200 | LRM | RT |
| ƒ | (f)ranc | 1100 0100 | 35 | 196 | LRM | RI |
| ₨ | (R)upee | 1100 1100 | 51 | 204 | LRM | RTI |
| ¢ | (c)ent | 1100 0010 | 67 | 194 | LRM | RM |
| $ | (S) | 1100 1010 | 83 | 202 | LRM | RTM |
| ‰ | | 1100 0110 | 99 | 198 | LRM | RIM |
| £ | (P)ound | 1100 1110 | 115 | 206 | LRM | RTIM |
| (E)scape | | 1100 1001 | 147 | 201 | LRM | RTR |
| Fig. Shft | | 1100 1101 | 179 | 205 | LRM | RTIR |
| # | | 1100 0011 | 195 | 195 | LRM | RMR |

SYMBOL CHORDS

| & | (N) | 1110 1001 | 151 | 233 | LRMI | RTR |
|---|---|---|---|---|---|---|
| π | Pi | 1001 1001 | 153 | 153 | LRT | RTR |
| ² | Squared | 0101 1001 | 154 | 89 | LMT | RTR |
| · | Multiply | 1101 1001 | 155 | 217 | LRMT | RTR |
| ° | Degree | 0011 1001 | 156 | 57 | LIT | RTR |
| ■ | Square | 1011 1001 | 157 | 185 | LRIT | RTR |
| · | Spot | 0111 1001 | 158 | 121 | LMIT | RTR |
| @ | | 0001 1101 | 184 | 29 | LT | RTIR |
| à | | 0001 0110 | 104 | 22 | LT | RIM |
| Å | | 0001 1110 | 120 | 30 | LT | RTIM |
| § | Section | 0101 0100 | 42 | 84 | LMT | RI |
| μ | Micro | 0110 0011 | 198 | 99 | LMI | RMR |

GRAPHIC CHORDS

| (c)hord 1 ⌐ | 1001 0010 | 73 | 146 | LRT | RM |
|---|---|---|---|---|---|
| (c)hord 2 ¬ | 0101 0010 | 74 | 82 | LMT | RM |
| (c)hord 3 ∟ | 1101 0010 | 75 | 210 | LRMT | RM |
| (c)hord 4 ⌐ | 0011 0010 | 76 | 50 | LIT | RM |
| (c)hord 5 — | 1011 0010 | 77 | 178 | LRIT | RM |
| \| Vert. line | 1110 0010 | 71 | 226 | LRMI | RM |
| Light (B)ox | 1010 1100 | 53 | 172 | LRI | RTI |
| Dark (B)ox | 1110 1100 | 55 | 236 | LRMI | RTI |
| Shaded (B)ox | 1101 1100 | 59 | 220 | LRMT | RTI |
| Black (B)ox ■ | 1110 1110 | 119 | 238 | LRMI | RTIM |
| Top ½ Black ▀ | 0101 1000 | 26 | 88 | LMT | RT |
| Bottom ½ Black ▄ | 1010 0001 | 133 | 161 | LRI | RR |
| Left ½ Black ▌ | 0011 1101 | 188 | 61 | LIT | RTIR |
| Right ½ Black ▐ | 1100 1011 | 211 | 203 | LRM | RTMI |

FIG. 2L-2

| Underline | 1110 | 1000 | 23 | 232 | LRMI | RT |
| \ | 1110 | 0100 | 39 | 228 | LRMI | RI |
| | | 1110 | 0010 | 71 | 226 | LRMI | RM |
| / | 1110 | 0001 | 135 | 225 | LRMI | RR |

FIG. 2M-1

0 (NULL) CHORD GROUP (0)

| OCTAL # | BINARY # | REVERSE BINARY # | ASCII EQUIVALENT |
|---|---|---|---|
| 0 | 0 | 0000 0000 | Null (0) |
| 1 | 128 | 1000 0000 | o (111) |
| 2 | 64 | 0100 0000 | i (105) |
| 3 | 192 | 1100 0000 | * (42) |
| 4 | 32 | 0010 0000 | e (101) |
| 5 | 160 | 1010 0000 | oe |
| 6 | 96 | 0110 0000 | u (117) |
| 7 | 224 | 1110 0000 | Backspace (8) |
| 8 | 16 | 0001 0000 | a (97) |
| 9 | 144 | 1001 0000 | y (121) |
| 10 | 80 | 0101 0000 | ( (40) |
| 11 | 208 | 1101 0000 | [ (91) |
| 12 | 48 | 0011 0000 | æ (145) |
| 13 | 176 | 1011 0000 | (NO) Neg. Acknowledge (21) |
| 14 | 112 | 0111 0000 | (YES) Acknowledge (6) |
| 15 | 240 | 1111 0000 | Delete |

1ST CHORD GROUP (16)

| OCTAL # | BINARY # | REVERSE BINARY # | ASCII EQUIVALENT |
|---|---|---|---|
| 16 | 8 | 0000 1000 | Space (32) |
| 17 | 136 | 1000 1000 | O (79) |
| 18 | 72 | 0100 1000 | I (73) |
| 19 | 200 | 1100 1000 | ¥ Yen (157) |
| 20 | 40 | 0010 1000 | E (69) |
| 21 | 168 | 1010 1000 | OE |
| 22 | 104 | 0110 1000 | U (85) |
| 23 | 232 | 1110 1000 | Underline (95) |
| 24 | 24 | 0001 1000 | A (65) |
| 25 | 152 | 1001 1000 | Y (89) |
| 26 | 88 | 0101 1000 | ■ (223) |
| 27 | 216 | 1101 1000 | Data link escape (16) |
| 28 | 56 | 0011 1000 | Æ (146) |
| 29 | 184 | 1011 1000 | Unit Separator (31) |
| 30 | 120 | 0111 1000 | Page Up |
| 31 | 248 | 1111 1000 | Cursor Up |

2ND CHORD GROUP (32)

| OCTAL # | BINARY # | REVERSE BINARY # | ASCII EQUIVALENT |
|---|---|---|---|
| 32 | 4 | 0000 0100 | . (46) |
| 33 | 132 | 1000 0100 | τ (114) |
| 34 | 68 | 0100 0100 | l (108) |
| 35 | 196 | 1100 0100 | f (159) |
| 36 | 36 | 0010 0100 | f (102) |
| 37 | 164 | 1010 0100 | > (62) |
| 38 | 100 | 0110 0100 | v (118) |
| 39 | 228 | 1110 0100 | \ (92) |
| 40 | 20 | 0001 0100 | b (98) |
| 41 | 148 | 1001 0100 | z (122) |
| 42 | 84 | 0101 0100 | § Section Symbol |
| 43 | 212 | 1101 0100 | Reset |
| 44 | 52 | 0011 0100 | Audible (b)ell (7) |
| 45 | 180 | 1011 0100 | GOTO |
| 46 | 116 | 0111 0100 | MOVE |
| 47 | 244 | 1111 0100 | Control |

FIG. 2M-2

3RD CHORD GROUP (48)

| | | | | |
|---|---|---|---|---|
| 48 | 12  | 0000 | 1100 | Break |
| 49 | 140 | 1000 | 1100 | R (82) |
| 50 | 76  | 0100 | 1100 | L (76) |
| 51 | 204 | 1100 | 1100 | R (158) |
| 52 | 44  | 0010 | 1100 | F (70) |
| 53 | 172 | 1010 | 1100 |   (176) |
| 54 | 108 | 0110 | 1100 | V (86) |
| 55 | 236 | 1110 | 1100 |   (178) |
| 56 | 28  | 0001 | 1100 | B (66) |
| 57 | 156 | 1001 | 1100 | Z (90) |
| 58 | 92  | 0101 | 1100 | ± (241) |
| 59 | 220 | 1101 | 1100 |   (177) |
| 60 | 60  | 0011 | 1100 | Form Feed (12) |
| 61 | 188 | 1011 | 1100 | Record Separator (30) |
| 62 | 124 | 0111 | 1100 | « (174) |
| 63 | 252 | 1111 | 1100 | Cursor Left |

4TH CHORD GROUP (64)

| | | | | |
|---|---|---|---|---|
| 64 | 2   | 0000 | 0010 | ! (33) |
| 65 | 130 | 1000 | 0010 | s (115) |
| 66 | 66  | 0100 | 0010 | m (109) |
| 67 | 194 | 1100 | 0010 | ¢ (155) |
| 68 | 34  | 0010 | 0010 | g (103) |
| 69 | 162 | 1010 | 0010 | i (173) |
| 70 | 98  | 0110 | 0010 | w (119) |
| 71 | 226 | 1110 | 0010 | \| (179) |
| 72 | 18  | 0001 | 0010 | c (99) |
| 73 | 146 | 1001 | 0010 | ⌐ (218) |
| 74 | 82  | 0101 | 0010 | ⌐ (191) |
| 75 | 210 | 1101 | 0010 | ⌐ (192) |
| 76 | 50  | 0011 | 0010 | ⌐ (217) |
| 77 | 178 | 1011 | 0010 | — (196) |
| 78 | 114 | 0111 | 0010 | Horizontal Tab (9) |
| 79 | 242 | 1111 | 0010 | Vertical Tab (11) |

5TH CHORD GROUP (80)

| | | | | |
|---|---|---|---|---|
| 80 | 10  | 0000 | 1010 | ) (41) |
| 81 | 138 | 1000 | 1010 | S (83) |
| 82 | 74  | 0100 | 1010 | M (77) |
| 83 | 202 | 1100 | 1010 | $ (36) |
| 84 | 42  | 0010 | 1010 | G (71) |
| 85 | 170 | 1010 | 1010 | Start of Heading (1) |
| 86 | 106 | 0110 | 1010 | W (87) |
| 87 | 234 | 1110 | 1010 | Start of Text (2) |
| 88 | 26  | 0001 | 1010 | C (67) |
| 89 | 154 | 1001 | 1010 | End of Text (3) |
| 90 | 90  | 0101 | 1010 | End of Transmit (4) |
| 91 | 218 | 1101 | 1010 | End trans. block (23) |
| 92 | 58  | 0011 | 1010 | End of Medium (25) |
| 93 | 186 | 1011 | 1010 | Group Separator (29) |
| 94 | 122 | 0111 | 1010 | End |
| 95 | 250 | 1111 | 1010 | Cancel (24) |

FIG. 2M-3

6TH CHORD GROUP (96)

| | | | | |
|---|---|---|---|---|
| 96 | 6 | 0000 | 0110 | : (58) |
| 97 | 134 | 1000 | 0110 | p (112) |
| 98 | 70 | 0100 | 0110 | j (106) |
| 99 | 198 | 1100 | 0110 | % (37) |
| 100 | 38 | 0010 | 0110 | ' |
| 101 | 166 | 1010 | 0110 | Print Line (Braille) |
| 102 | 102 | 0110 | 0110 | Copy |
| 103 | 230 | 1110 | 0110 | á (160) |
| 104 | 22 | 0001 | 0110 | å (134) |
| 105 | 150 | 1001 | 0110 | ú (163) |
| 106 | 86 | 0101 | 0110 | Print |
| 107 | 214 | 1101 | 0110 | é (130) |
| 108 | 54 | 0011 | 0110 | Print Screen |
| 109 | 182 | 1011 | 0110 | í (161) |
| 110 | 118 | 0111 | 0110 | ó (162) |
| 111 | 246 | 1111 | 0110 | HOME |

7TH CHORD GROUP (112)

| | | | | |
|---|---|---|---|---|
| 112 | 14 | 0000 | 1110 | ? (63) |
| 113 | 142 | 1000 | 1110 | P (80) |
| 114 | 78 | 0100 | 1110 | J (74) |
| 115 | 206 | 1100 | 1110 | £ (156) |
| 116 | 46 | 0010 | 1110 | Enquiry (5) |
| 117 | 174 | 1010 | 1110 | ¿ (168) |
| 118 | 110 | 0110 | 1110 | void 1 |
| 119 | 238 | 1110 | 1110 | ■ (219) |
| 120 | 30 | 0001 | 1110 | Å (143) |
| 121 | 158 | 1001 | 1110 | void 2 |
| 122 | 94 | 0101 | 1110 | void 3 |
| 123 | 222 | 1101 | 1110 | É (144) |
| 124 | 62 | 0011 | 1110 | » (175) |
| 125 | 190 | 1011 | 1110 | = (240) |
| 126 | 126 | 0111 | 1110 | Line Feed (10) |
| 127 | 254 | 1111 | 1110 | HELP |

8TH CHORD GROUP (128)

| | | | | |
|---|---|---|---|---|
| 128 | 1 | 0000 | 0001 | , (44) |
| 129 | 129 | 1000 | 0001 | t (116) |
| 130 | 65 | 0100 | 0001 | n (110) |
| 131 | 193 | 1100 | 0001 | void 4 |
| 132 | 33 | 0010 | 0001 | h (104) |
| 133 | 161 | 1010 | 0001 | ■ (220) |
| 134 | 97 | 0110 | 0001 | x (120) |
| 135 | 225 | 1110 | 0001 | / (47) |
| 136 | 17 | 0001 | 0001 | d (100) |
| 137 | 145 | 1001 | 0001 | Device Control 1 (17) |
| 138 | 81 | 0101 | 0001 | Device Control 2 (18) |
| 139 | 209 | 1101 | 0001 | Device Control 3 (19) |
| 140 | 49 | 0011 | 0001 | Device Control 4 (20) |
| 141 | 177 | 1011 | 0001 | ( (123) |
| 142 | 113 | 0111 | 0001 | Page Down |
| 143 | 241 | 1111 | 0001 | Cursor Down |

FIG. 2M-4

9TH CHORD GROUP (144)

| | | | | |
|---|---|---|---|---|
| 144 | 9   | 0000 | 1001 | '  (39) |
| 145 | 137 | 1000 | 1001 | T  (84) |
| 146 | 73  | 0100 | 1001 | N  (78) |
| 147 | 201 | 1100 | 1001 | Escape (27) |
| 148 | 41  | 0010 | 1001 | H  (72) |
| 149 | 169 | 1010 | 1001 | void 5 |
| 150 | 105 | 0110 | 1001 | X  (88) |
| 151 | 233 | 1110 | 1001 | &  (38) |
| 152 | 25  | 0001 | 1001 | D  (68) |
| 153 | 153 | 1001 | 1001 | π Pi (227) |
| 154 | 89  | 0101 | 1001 | ² Squared (253) |
| 155 | 217 | 1101 | 1001 | · Multiply (250) |
| 156 | 57  | 0011 | 1001 | ° degree (248) |
| 157 | 185 | 1011 | 1001 | ■ Square (254) |
| 158 | 121 | 0111 | 1001 | · Spot (249) |
| 159 | 249 | 1111 | 1001 | SUBstitution (26) |

10TH CHORD GROUP (160)

| | | | | |
|---|---|---|---|---|
| 160 | 5   | 0000 | 0101 | ;  (59) |
| 161 | 133 | 1000 | 0101 | º (167) |
| 162 | 69  | 0100 | 0101 | ñ (164) |
| 163 | 197 | 1100 | 0101 | ≤ (243) |
| 164 | 37  | 0010 | 0101 | < (60) |
| 165 | 165 | 1010 | 0101 | Synchronous Idle (22) |
| 166 | 101 | 0110 | 0101 | ÿ (152) |
| 167 | 229 | 1110 | 0101 | ä (132) |
| 168 | 21  | 0001 | 0101 | ª (166) |
| 169 | 149 | 1001 | 0101 | ü (129) |
| 170 | 85  | 0101 | 0101 | ß (ss) German (225) |
| 171 | 213 | 1101 | 0101 | ë (137) |
| 172 | 53  | 0011 | 0101 | ¨ |
| 173 | 181 | 1011 | 0101 | ï (139) |
| 174 | 117 | 0111 | 0101 | ö (148) |
| 175 | 245 | 1111 | 0101 | Shift Out (14) |

11TH CHORD GROUP (176)

| | | | | |
|---|---|---|---|---|
| 176 | 13  | 0000 | 1101 | "  (34) |
| 177 | 141 | 1000 | 1101 | }  (125) |
| 178 | 77  | 0100 | 1101 | Ñ (165) |
| 179 | 205 | 1100 | 1101 | Figures Shift (28) |
| 180 | 45  | 0010 | 1101 | ~  (126) |
| 181 | 173 | 1010 | 1101 | void 6 |
| 182 | 109 | 0110 | 1101 | ≈ (247) |
| 183 | 237 | 1110 | 1101 | Ä (142) |
| 184 | 29  | 0001 | 1101 | @  (64) |
| 185 | 157 | 1001 | 1101 | Ü (154) |
| 186 | 93  | 0101 | 1101 | void 7 |
| 187 | 221 | 1101 | 1101 | void 8 |
| 188 | 61  | 0011 | 1101 | ❘ (221) |
| 189 | 189 | 1011 | 1101 | Scroll Lock |
| 190 | 125 | 0111 | 1101 | Ö (153) |
| 191 | 253 | 1111 | 1101 | Shift In (15) |

FIG. 2M-5

12TH CHORD GROUP (192)

| | | | | |
|---|---|---|---|---|
| 192 | 3 | 0000 | 0011 | Cursor Right (Tab) |
| 193 | 131 | 1000 | 0011 | q (113) |
| 194 | 67 | 0100 | 0011 | k (107) |
| 195 | 195 | 1100 | 0011 | # (35) |
| 196 | 35 | 0010 | 0011 | ` (96) |
| 197 | 163 | 1010 | 0011 | ≥ (242) |
| 198 | 99 | 0110 | 0011 | μ Micro (230) |
| 199 | 227 | 1110 | 0011 | à (133) |
| 200 | 19 | 0001 | 0011 | ç (135) |
| 201 | 147 | 1001 | 0011 | ù .(151) |
| 202 | 83 | 0101 | 0011 | void 9 |
| 203 | 211 | 1101 | 0011 | è (138) |
| 204 | 51 | 0011 | 0011 | Cursor |
| 205 | 179 | 1011 | 0011 | ì (141) |
| 206 | 115 | 0111 | 0011 | ò (149) |
| 207 | 243 | 1111 | 0011 | Cursor Right |

13TH CHORD GROUP (208)

| | | | | |
|---|---|---|---|---|
| 208 | 11 | 0000 | 1011 | ] (93) |
| 209 | 139 | 1000 | 1011 | Q (81) |
| 210 | 75 | 0100 | 1011 | K (75) |
| 211 | 203 | 1100 | 1011 | | (222) |
| 212 | 43 | 0010 | 1011 | ^ (94) |
| 213 | 171 | 1010 | 1011 | void 10 |
| 214 | 107 | 0110 | 1011 | void 11 |
| 215 | 235 | 1110 | 1011 | â (131) |
| 216 | 27 | 0001 | 1011 | ç (128) |
| 217 | 155 | 1001 | 1011 | ü (150) |
| 218 | 91 | 0101 | 1011 | ½ (171) |
| 219 | 219 | 1101 | 1011 | ê (136) |
| 220 | 59 | 0011 | 1011 | ¼ (172) |
| 221 | 187 | 1011 | 1011 | î (140) |
| 222 | 123 | 0111 | 1011 | ô (147) |
| 223 | 251 | 1111 | 1011 | Alternate |

14TH CHORD GROUP (224)

| | | | | |
|---|---|---|---|---|
| 224 | 7 | 0000 | 0111 | (Enter) Carriage Return (13) |
| 225 | 135 | 1000 | 0111 | F1 |
| 226 | 71 | 0100 | 0111 | F2 |
| 227 | 199 | 1100 | 0111 | F3 |
| 228 | 39 | 0010 | 0111 | F4 |
| 229 | 167 | 1010 | 0111 | F5 |
| 230 | 103 | 0110 | 0111 | F6 |
| 231 | 231 | 1110 | 0111 | F7 |
| 232 | 23 | 0001 | 0111 | F8 |
| 233 | 151 | 1001 | 0111 | F9 |
| 234 | 87 | 0101 | 0111 | F10 |
| 235 | 215 | 1101 | 0111 | F11 |
| 236 | 55 | 0011 | 0111 | F12 |
| 237 | 183 | 1011 | 0111 | F13 |
| 238 | 119 | 0111 | 0111 | F14 |
| 239 | 247 | 1111 | 0111 | F15 |

FIG. 2M-6

15TH CHORD GROUP (240)

| | | | | |
|---|---|---|---|---|
| 240 | 15  | 0000 | 1111 | 0   (48) |
| 241 | 143 | 1000 | 1111 | 1   (49) |
| 242 | 79  | 0100 | 1111 | 2   (50) |
| 243 | 207 | 1100 | 1111 | 3   (51) |
| 244 | 47  | 0010 | 1111 | 4   (52) |
| 245 | 175 | 1010 | 1111 | 5   (53) |
| 246 | 111 | 0110 | 1111 | 6   (54) |
| 247 | 239 | 1110 | 1111 | 7   (55) |
| 248 | 31  | 0001 | 1111 | 8   (56) |
| 249 | 159 | 1001 | 1111 | 9   (57) |
| 250 | 95  | 0101 | 1111 | +   (43) |
| 251 | 223 | 1101 | 1111 | x (Multiply) |
| 252 | 63  | 0011 | 1111 | -   (45) |
| 253 | 191 | 1011 | 1111 | ÷ (246) Division Symbol |
| 254 | 127 | 0111 | 1111 | =   (61) |
| 255 | 255 | 1111 | 1111 | Insert |

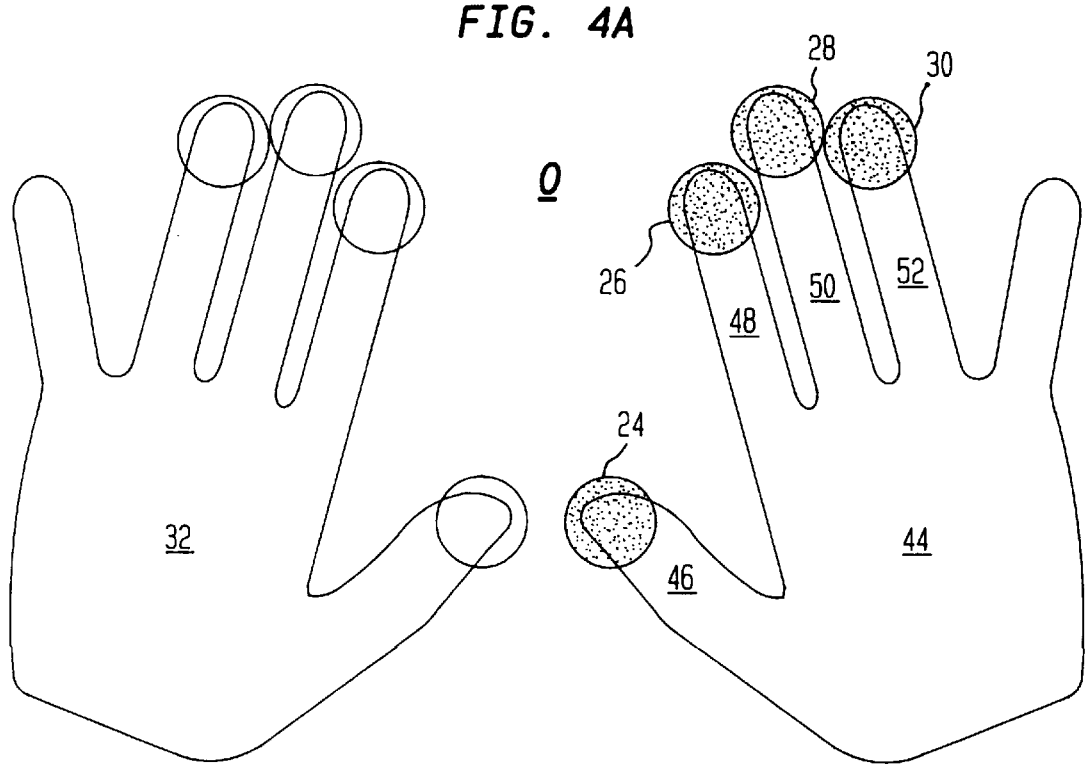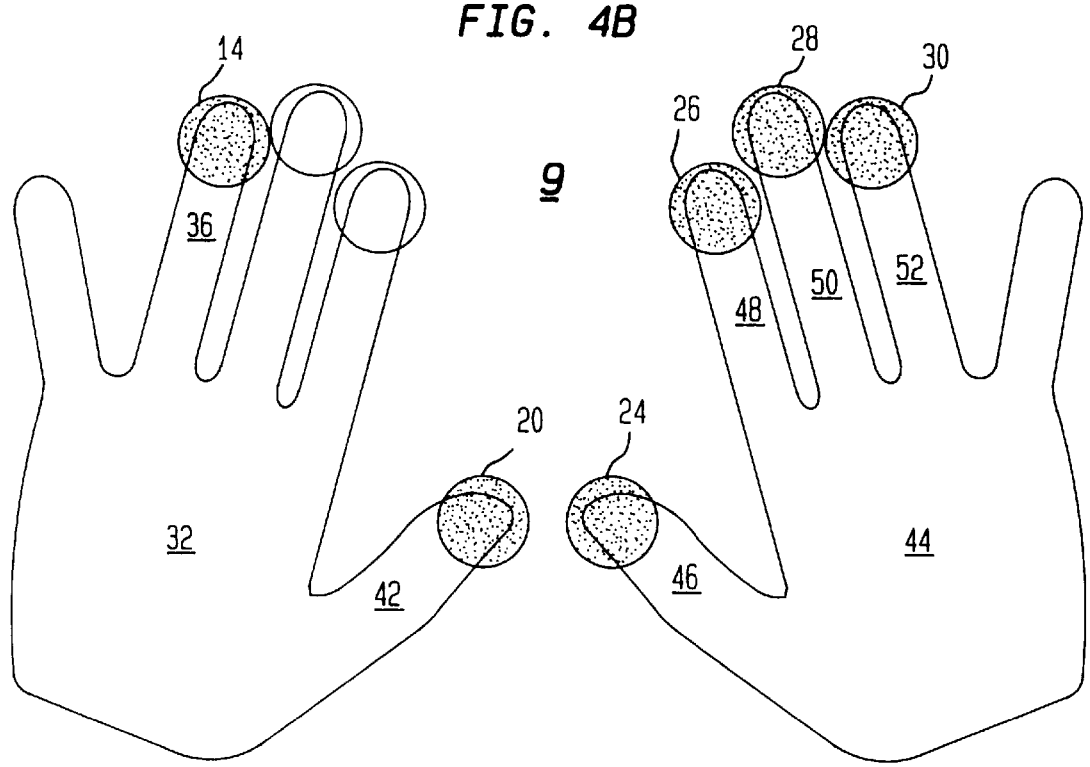

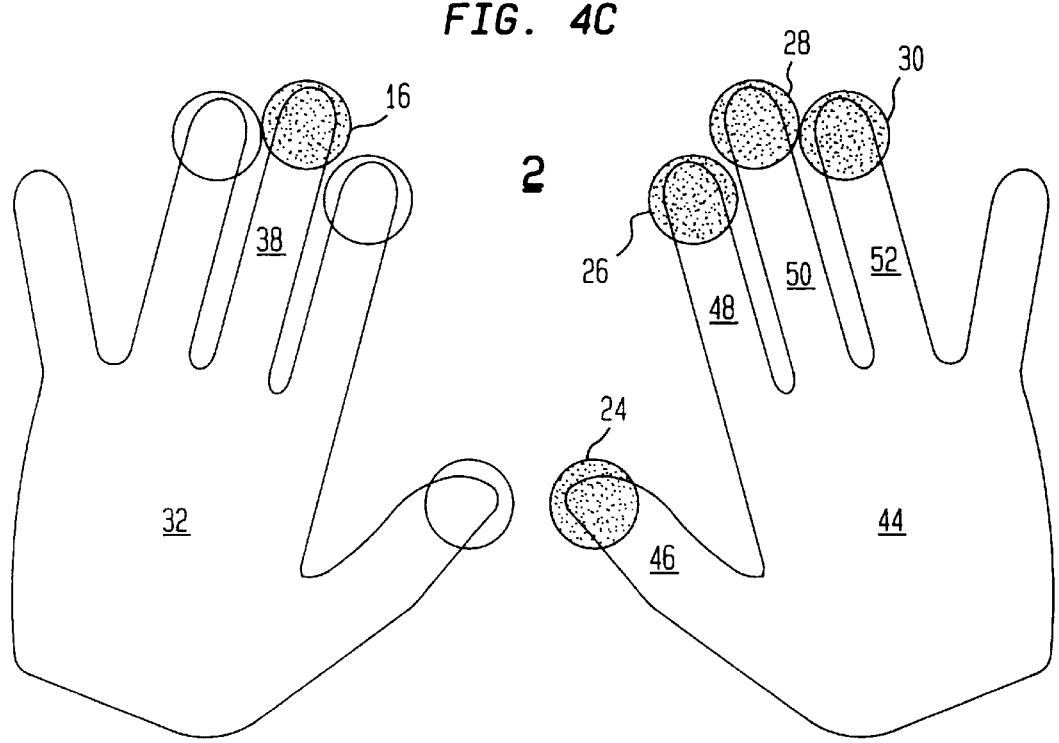
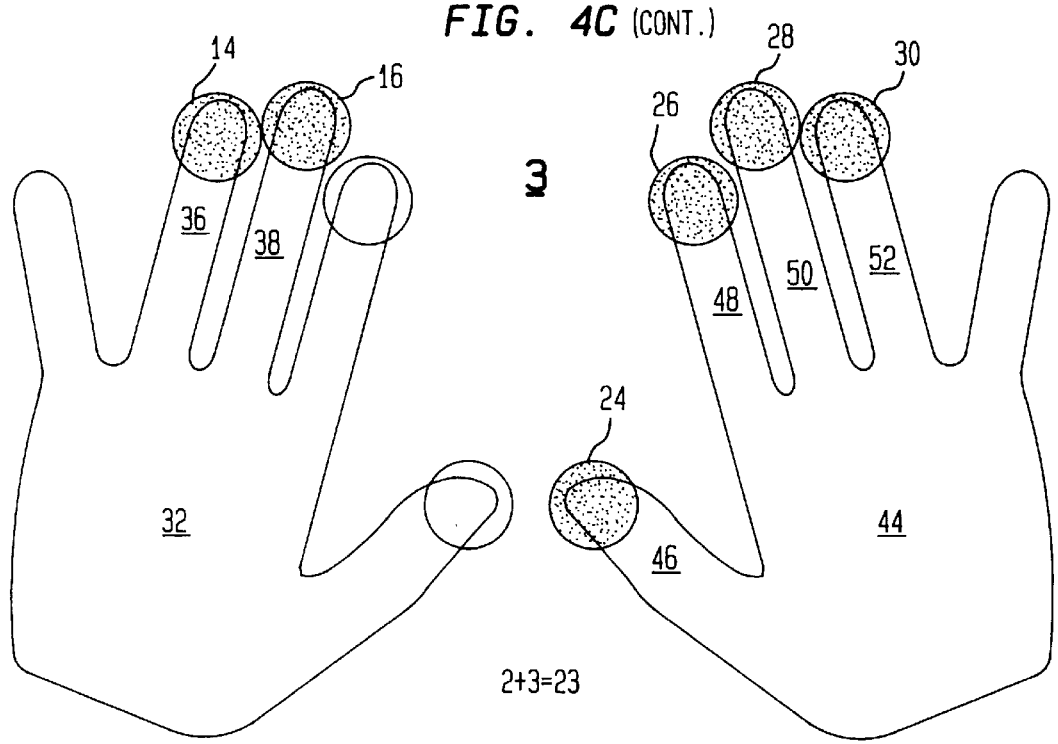

FIG. 8A
(PRIOR ART)

| Key | Code1 | Code2 | Key | Code1 | Code2 | Key | Code1 | Code2 |
|---|---|---|---|---|---|---|---|---|
| Sp | _ _ _ _ | T _ _ _ | BkSp | R M I _ | _ _ _ _ | Enter | _ _ _ _ | _ I M R |
| a | _ _ _ T | _ _ _ _ | A | _ _ _ T | T _ _ _ | Tab | _ _ _ _ | _ _ M R |
| b | _ _ _ T | _ I _ _ | B | _ _ _ T | T I _ _ | BkTb | R M _ _ | _ _ _ _ |
| c | _ _ _ T | _ _ M _ | C | _ _ _ T | T _ M _ | Ctrl | R M I T | _ I _ _ |
| d | _ _ _ T | _ _ _ R | D | _ _ _ T | T _ _ R | Alt | R M I T | T _ M R |
| e | _ _ I _ | _ _ _ _ | E | _ _ I _ | T _ _ _ | ShftIn | R M I T | T I _ R |
| f | _ _ I _ | _ I _ _ | F | _ _ I _ | T I _ _ | ShftOut | R M I T | _ I _ R |
| g | _ _ I _ | _ _ M _ | G | _ _ I _ | T _ M _ | Del | R M I T | _ _ _ _ |
| h | _ _ I _ | _ _ _ R | H | _ _ I _ | T _ _ R | Esc | R M _ _ | T _ _ _ |
| i | _ M _ _ | _ _ _ _ | I | _ M _ _ | T _ _ _ | Insert | R M I T | T I M R |
| j | _ M _ _ | _ I M _ | J | _ M _ _ | T I M _ | PgUp | _ M I T | T _ _ _ |
| k | _ M _ _ | _ _ M R | K | _ M _ _ | T _ M R | PgDn | _ M I T | _ _ _ R |
| l | _ M _ _ | _ I _ _ | L | _ M _ _ | T I _ _ | | | |
| m | _ M _ _ | _ _ M _ | M | _ M _ _ | T _ M _ | . | _ _ _ _ | _ I _ _ |
| n | _ M _ _ | _ _ _ R | N | _ M _ _ | T _ _ R | , | _ _ _ _ | _ _ _ R |
| o | R _ _ _ | _ _ _ _ | O | R _ _ _ | T _ _ _ | ! | _ _ _ _ | _ _ M _ |
| p | R _ _ _ | _ I M _ | P | R _ _ _ | T I M _ | ? | _ _ _ _ | T I M _ |
| q | R _ _ _ | _ _ M R | Q | R _ _ _ | T _ M R | : | _ _ _ _ | _ I M _ |
| r | R _ _ _ | _ I _ _ | R | R _ _ _ | T I _ _ | ; | _ _ _ _ | _ I _ R |
| s | R _ _ _ | _ _ M _ | S | R _ _ _ | T _ M _ | " | _ _ _ _ | T I _ R |
| t | R _ _ _ | _ _ _ R | T | R _ _ _ | T _ _ R | ' | _ _ _ _ | T _ _ R |
| u | _ M I _ | _ _ _ _ | U | _ M I _ | T _ _ _ | ` | _ _ I _ | _ _ M R |
| v | _ M I _ | _ I _ _ | V | _ M I _ | T I _ _ | | | |
| w | _ M I _ | _ _ M _ | W | _ M I _ | T _ M _ | ( | _ M _ T | _ _ _ _ |
| x | _ M I _ | _ _ _ R | X | _ M I _ | T _ _ R | ) | _ _ _ _ | T _ M _ |
| y | R _ _ T | _ _ _ _ | Y | R _ _ T | T _ _ _ | [ | R M _ T | _ _ _ _ |
| z | R _ _ T | _ I _ _ | Z | R _ _ T | T I _ _ | ] | _ _ _ _ | T _ M R |
| 0 | _ _ _ _ | T I M R | | | | { | R _ I T | _ _ _ R |
| 1 | R _ _ _ | T I M R | F1 | R _ _ _ | _ I M R | } | R _ _ _ | T I _ R |
| 2 | _ M _ _ | T I M R | F2 | _ M _ _ | _ I M R | < | _ _ I _ | _ I _ R |
| 3 | R M _ _ | T I M R | F3 | R M _ _ | _ I M R | > | R _ I _ | _ I _ _ |
| 4 | _ _ I _ | T I M R | F4 | _ _ I _ | _ I M R | | | |
| 5 | R _ I _ | T I M R | F5 | R _ I _ | _ I M R | _ | R M I _ | T _ _ _ |
| 6 | _ M I _ | T I M R | F6 | _ M I _ | _ I M R | \ | R M I _ | _ I _ _ |
| 7 | R M I _ | T I M R | F7 | R M I _ | _ I M R | \| | R M I _ | _ _ M _ |
| 8 | _ _ _ T | T I M R | F8 | _ _ _ T | _ I M R | / | R M I _ | _ _ _ R |
| 9 | R _ _ T | T I M R | F9 | R _ _ T | _ I M R | * | R M _ _ | _ _ _ R |
| + | _ M _ T | T I M R | F10 | _ M _ T | _ I M R | @ | _ _ _ T | T I _ R |
| x | R M _ T | T I M R | F11 | R M _ T | _ I M R | # | R M _ _ | _ _ M R |
| - | _ _ I T | T I M R | F12 | _ _ I T | _ I M R | $ | R M _ _ | T _ M _ |
| / | R _ I T | T I M R | F13 | R _ I T | _ I M R | ^ | _ _ I _ | T _ M R |
| = | _ M I T | T I M R | F14 | _ M I T | _ I M R | & | R M I _ | T _ _ R |
| | | | F15 | R M I T | _ I M R | | | |
| Up | R M I T | T _ _ _ | Lt | R M I T | T I _ _ | Home | R M I T | _ I M _ |
| Dn | R M I T | _ _ _ R | Rt | R M I T | _ _ M R | End | R M I T | T _ _ R |

FIG. 8B
(PRIOR ART)

| Key | Code1 | Code2 | Key | Code1 | Code2 | Key | Code1 | Code2 |
|---|---|---|---|---|---|---|---|---|
| Sp | _ _ _ T | _ _ _ _ | BkSp | _ _ _ _ | _ IMR | Enter | RMI _ | _ _ _ _ |
| a | _ _ _ _ | T _ _ _ | A | _ _ _ T | T _ _ _ | Tab | RM _ _ | _ _ _ _ |
| b | _ _ I _ | T _ _ _ | B | _ _ I T | T _ _ _ | BkTb | _ _ _ _ | _ _ MR |
| c | _ M _ _ | T _ _ _ | C | _ M _ T | T _ _ _ | Ctrl | _ _ I _ | TIMR |
| d | R _ _ _ | T _ _ _ | D | R _ _ T | T _ _ _ | Alt | RM _ T | TIMR |
| e | _ _ _ _ | _ I _ _ | E | _ _ _ T | _ I _ _ | ShftIn | R _ IT | TIMR |
| f | _ _ I _ | _ I _ _ | F | _ _ I T | _ I _ _ | ShftOut | R _ I _ | TIMR |
| g | _ M _ _ | _ I _ _ | G | _ M _ T | _ I _ _ | Del | _ _ _ _ | TIMR |
| h | R _ _ _ | _ I _ _ | H | R _ _ T | _ I _ _ | Esc | _ _ _ T | _ _ MR |
| i | _ _ _ _ | _ _ M _ | I | _ _ _ T | _ _ M _ | Insert | RMIT | TIMR |
| j | _ MI _ | _ _ M _ | J | _ MIT | _ _ M _ | PgUp | _ _ _ T | TIM _ |
| k | RM _ _ | _ _ M _ | K | RM _ T | _ _ M _ | PgDn | R _ _ _ | TIM _ |
| l | _ _ I _ | _ _ M _ | L | _ _ I T | _ _ M _ | | | |
| m | _ M _ _ | _ _ M _ | M | _ M _ T | _ _ M _ | . | _ _ I _ | _ _ _ _ |
| n | R _ _ _ | _ _ M _ | N | R _ _ T | _ _ M _ | , | R _ _ _ | _ _ _ _ |
| o | _ _ _ _ | _ _ _ R | O | _ _ _ T | _ _ _ R | ! | _ M _ _ | _ _ _ _ |
| p | _ MI _ | _ _ _ R | P | _ MIT | _ _ _ R | ? | MIT _ | _ _ _ _ |
| q | RM _ _ | _ _ _ R | Q | RM _ T | _ _ _ R | : | _ MI _ | _ _ _ _ |
| r | _ _ I _ | _ _ _ R | R | _ _ I T | _ _ _ R | ; | R _ I _ | _ _ _ _ |
| s | _ M _ _ | _ _ _ R | S | _ M _ T | _ _ _ R | " | R _ IT | _ _ _ _ |
| t | R _ _ _ | _ _ _ R | T | R _ _ T | _ _ _ R | ' | R _ _ T | _ _ _ _ |
| u | _ _ _ _ | _ IM _ | U | _ _ _ T | _ IM _ | ` | RM _ _ | _ I _ _ |
| v | _ _ I _ | _ IM _ | V | _ _ I T | _ IM _ | | | |
| w | _ M _ _ | _ IM _ | W | _ M _ T | _ IM _ | ( | _ _ _ _ | T _ M _ |
| x | R _ _ _ | _ IM _ | X | R _ _ T | _ IM _ | ) | _ M _ T | _ _ _ _ |
| y | _ _ _ _ | T _ _ R | Y | _ _ _ T | T _ _ R | [ | _ _ _ _ | T _ MR |
| z | _ _ I _ | T _ _ R | Z | _ _ I T | T _ _ R | ] | RM _ T | _ _ _ _ |
| 0 | RMIT | _ _ _ _ | | | | { | R _ _ _ | TI _ R |
| 1 | RMIT | _ _ _ R | F1 | RMI _ | _ _ _ R | } | R _ IT | _ _ _ R |
| 2 | RMIT | _ _ M _ | F2 | RMI _ | _ _ M _ | < | R _ I _ | _ I _ _ |
| 3 | RMIT | _ _ MR | F3 | RMI _ | _ _ MR | > | _ _ I _ | _ I _ R |
| 4 | RMIT | _ I _ _ | F4 | RMI _ | _ I _ _ | | | |
| 5 | RMIT | _ I _ R | F5 | RMI _ | _ I _ R | _ | _ _ _ T | _ IMR |
| 6 | RMIT | _ IM _ | F6 | RMI _ | _ IM _ | \ | _ _ I _ | _ IMR |
| 7 | RMIT | _ IMR | F7 | RMI _ | _ IMR | \| | _ M _ _ | _ IMR |
| 8 | RMIT | T _ _ _ | F8 | RMI _ | T _ _ _ | / | R _ _ _ | _ IMR |
| 9 | RMIT | T _ _ R | F9 | RMI _ | T _ _ R | * | R _ _ _ | _ _ MR |
| + | RMIT | T _ M _ | F10 | RMI _ | T _ M _ | @ | R _ IT | T _ _ _ |
| x | RMIT | T _ MR | F11 | RMI _ | T _ MR | # | RM _ _ | _ _ MR |
| - | RMIT | TI _ _ | F12 | RMI _ | TI _ _ | $ | _ M _ T | _ _ MR |
| / | RMIT | TI _ R | F13 | RMI _ | TI _ R | ^ | RM _ T | _ I _ _ |
| = | RMIT | T IM _ | F14 | RMI _ | T IM _ | & | R _ _ T | _ IMR |
| | | | F15 | RMI _ | _ IMR | | | |
| Up | _ _ _ T | TIMR | Lt | _ _ IT | TIMR | Home | _ MI _ | TIMR |
| Dn | R _ _ _ | TIMR | Rt | RM _ _ | TIMR | End | R _ _ T | TIMR |

FIG. 9
(PRIOR ART)

| Dec | Hex | Char | Dec | Hex | Char | Dec | Hex | Char |
|---|---|---|---|---|---|---|---|---|
| 0 | 00 | NUL | 44 | 2C | , | 88 | 58 | X |
| 1 | 01 | SOH | 45 | 2D | - | 89 | 59 | Y |
| 2 | 02 | STX | 46 | 2E | . | 90 | 5A | Z |
| 3 | 03 | ETX | 47 | 2F | / | 91 | 5B | [ |
| 4 | 04 | EOT | 48 | 30 | 0 | 92 | 5C | \ |
| 5 | 05 | ENQ | 49 | 31 | 1 | 93 | 5D | ] |
| 6 | 06 | ACK | 50 | 32 | 2 | 94 | 5E | ^ |
| 7 | 07 | BEL | 51 | 33 | 3 | 95 | 5F | _ |
| 8 | 08 | BS | 52 | 34 | 4 | 96 | 60 | ` |
| 9 | 09 | HT | 53 | 35 | 5 | 97 | 61 | a |
| 10 | 0A | LF | 54 | 36 | 6 | 98 | 62 | b |
| 11 | 0B | VT | 55 | 37 | 7 | 99 | 63 | c |
| 12 | 0C | FF | 56 | 38 | 8 | 100 | 64 | d |
| 13 | 0D | CR | 57 | 39 | 9 | 101 | 65 | e |
| 14 | 0E | SO | 58 | 3A | : | 102 | 66 | f |
| 15 | 0F | SI | 59 | 3B | ; | 103 | 67 | g |
| 16 | 10 | DLE | 60 | 3C | < | 104 | 68 | h |
| 17 | 11 | DC1 | 61 | 3D | = | 105 | 69 | i |
| 18 | 12 | DC2 | 62 | 3E | > | 106 | 6A | j |
| 19 | 13 | DC3 | 63 | 3F | ? | 107 | 6B | k |
| 20 | 14 | DC4 | 64 | 40 | @ | 108 | 6C | l |
| 21 | 15 | NAK | 65 | 41 | A | 109 | 6D | m |
| 22 | 16 | SYN | 66 | 42 | B | 110 | 6E | n |
| 23 | 17 | ETB | 67 | 43 | C | 111 | 6F | o |
| 24 | 18 | CAN | 68 | 44 | D | 112 | 70 | p |
| 25 | 19 | EM | 69 | 45 | E | 113 | 71 | q |
| 26 | 1A | SUB | 70 | 46 | F | 114 | 72 | r |
| 27 | 1B | ESC | 71 | 47 | G | 115 | 73 | s |
| 28 | 1C | FS | 72 | 48 | H | 116 | 74 | t |
| 29 | 1D | GS | 73 | 49 | I | 117 | 75 | u |
| 30 | 1E | RS | 74 | 4A | J | 118 | 76 | v |
| 31 | 1F | US | 75 | 4B | K | 119 | 77 | w |
| 32 | 20 | <space> | 76 | 4C | L | 120 | 78 | x |
| 33 | 21 | ! | 77 | 4D | M | 121 | 79 | y |
| 34 | 22 | " | 78 | 4E | N | 122 | 7A | z |
| 35 | 23 | # | 79 | 4F | O | 123 | 7B | { |
| 36 | 24 | $ | 80 | 50 | P | 124 | 7C | \| |
| 37 | 25 | % | 81 | 51 | Q | 125 | 7D | } |
| 38 | 26 | & | 82 | 52 | R | 126 | 7E | ~ |
| 39 | 27 | ' | 83 | 53 | S | 127 | 7F | DEL |
| 40 | 28 | ( | 84 | 54 | T | | | |
| 41 | 29 | ) | 85 | 55 | U | | | |
| 42 | 2A | * | 86 | 56 | V | | | |
| 43 | 2B | + | 87 | 57 | W | | | |

FIG. 10
(PRIOR ART)

| Dec | Hex | Char | Dec | Hex | Char | Dec | Hex | Char |
|---|---|---|---|---|---|---|---|---|
| 128 | 80 | Ç | 171 | AB | ½ | 214 | D6 | ╥ |
| 129 | 81 | ü | 172 | AC | ¼ | 215 | D7 | ╫ |
| 130 | 82 | é | 173 | AD | ¡ | 216 | D8 | ╪ |
| 131 | 83 | â | 174 | AE | « | 217 | D9 | ┘ |
| 132 | 84 | ä | 175 | AF | » | 218 | DA | ┌ |
| 133 | 85 | à | 176 | B0 | ░ | 219 | DB | █ |
| 134 | 86 | å | 177 | B1 | ▒ | 220 | DC | ▄ |
| 135 | 87 | ç | 178 | B2 | ▓ | 221 | DD | ▌ |
| 136 | 88 | ê | 179 | B3 | │ | 222 | DE | ▐ |
| 137 | 89 | ë | 180 | B4 | ┤ | 223 | DF | ▀ |
| 138 | 8A | è | 181 | B5 | ╡ | 224 | E0 | α |
| 139 | 8B | ï | 182 | B6 | ╢ | 225 | E1 | β |
| 140 | 8C | î | 183 | B7 | ╖ | 226 | E2 | Γ |
| 141 | 8D | ì | 184 | B8 | ╕ | 227 | E3 | π |
| 142 | 8E | Ä | 185 | B9 | ╣ | 228 | E4 | Σ |
| 143 | 8F | Å | 186 | BA | ║ | 229 | E5 | σ |
| 144 | 90 | É | 187 | BB | ╗ | 230 | E6 | μ |
| 145 | 91 | æ | 188 | BC | ╝ | 231 | E7 | τ |
| 146 | 92 | Æ | 189 | BD | ╜ | 232 | E8 | Φ |
| 147 | 93 | ô | 190 | BE | ╛ | 233 | E9 | Θ |
| 148 | 94 | ö | 191 | BF | ┐ | 234 | EA | Ω |
| 149 | 95 | ò | 192 | C0 | └ | 235 | EB | δ |
| 150 | 96 | û | 193 | C1 | ┴ | 236 | EC | ∞ |
| 151 | 97 | ù | 194 | C2 | ┬ | 237 | ED | φ |
| 152 | 98 | ÿ | 195 | C3 | ├ | 238 | EE | ε |
| 153 | 99 | Ö | 196 | C4 | ─ | 239 | EF | ∩ |
| 154 | 9A | Ü | 197 | C5 | ┼ | 240 | F0 | ≡ |
| 155 | 9B | ¢ | 198 | C6 | ╞ | 241 | F1 | ± |
| 156 | 9C | £ | 199 | C7 | ╟ | 242 | F2 | ≥ |
| 157 | 9D | ¥ | 200 | C8 | ╚ | 243 | F3 | ≤ |
| 158 | 9E | ₧ | 201 | C9 | ╔ | 244 | F4 | ⌠ |
| 159 | 9F | ƒ | 202 | CA | ╩ | 245 | F5 | ⌡ |
| 160 | A0 | á | 203 | CB | ╦ | 246 | F6 | ÷ |
| 161 | A1 | í | 204 | CC | ╠ | 247 | F7 | ≈ |
| 162 | A2 | ó | 205 | CD | ═ | 248 | F8 | ° |
| 163 | A3 | ú | 206 | CE | ╬ | 249 | F9 | ∙ |
| 164 | A4 | ñ | 207 | CF | ╧ | 250 | FA | · |
| 165 | A5 | Ñ | 208 | D0 | ╨ | 251 | FB | √ |
| 166 | A6 | ª | 209 | D1 | ╤ | 252 | FC | η |
| 167 | A7 | º | 210 | D2 | ╥ | 253 | FD | ² |
| 168 | A8 | ¿ | 211 | D3 | ╙ | 254 | FE | ■ |
| 169 | A9 | ⌐ | 212 | D4 | ╘ | 255 | FF |   |
| 170 | AA | ¬ | 213 | D5 | ╒ |     |    |   |

8-BIT BINARY CODE FOR USE AS AN 8-DOT BRAILLE ARRANGEMENT AND DATA ENTRY SYSTEM AND METHOD FOR 8-KEY CHORDIC BINARY KEYBOARDS

BACKGROUND OF THE INVENTION

This application is a re-filed application Ser. No. 07/829,987, filed Feb. 3, 1992 which was abandoned after being rejected. Two corrections were made in the code part of the re-filed application and amended to better help those skilled in the art to understand and use the invention.

1. Field of the Invention

This invention relates to an eight bit binary computer data code used as an eight dot braille arrangement and a system and method for entering or producing a space, letters, numbers, data, symbols, control, etc. on an eight key or sensor binary chordic keyboard manipulated by four digits of a first group by a preferred left hand and by four digits of a second group by a preferred right hand respectively.

2. Description of Related Art

There are a number of well-known, prior art keyboards and systems used for inputting alphanumeric data into typewriters, braille writers, word processors, computers, laptops, PDAs and the like. Unfortunately, most modem systems are inherently slow, difficult to learn, not organized in a logical fashion and/or cumbersome for the general population, including the handicapped and sight disabled.

The best known system is the QWERTY keyboard layout which derives its name from the first six letters of the top row of the alphabet keys or sensors. The QWERTY system has been around for many years and was originally implemented in order to slow down typists so that manual typewriter keys would not jam. A good explanation of the history of the QWERTY keyboard is set forth in an article entitled "TYPING WITH A TWO-HAND CHORD KEYBOARD: WILL THE QWERTY BECOME OBSOLETE?" by Daniel Gopher and David Raij, IEEE Transactions on Systems, Man, and Cybernetics, Volume 18, No. 4, July–August 1988, pages 601–609.

In response to the relatively slow and cumbersome QWERTY system, some new word processors and computers have moved to a Dvorak layout, although very few. One of the characteristics of the Dvorak keyboard is that the vowels a, o, e, u and i form the first five keys of the second alphabetic row of the keyboard. The United States Department of the Navy tested the Dvorak design and found up to a twenty percent increase in typing speeds. While improved efficiencies are possible and proven with the Dvorak keyboard, it does have some drawbacks, the major one of which is that the keys are not laid out in an ergonomic fashion to follow the natural positions of the hands. Moreover, because there are more keys than the operator has digits, it is necessary for the operator to move his or her hands frequently and fingers up/down or left/right to find and depress the appropriate key or keys. This tends to reduce the overall speed of the typist.

In order to increase speed, the chordic keyboard was invented. There are a number of chordic keyboards on the market, some of which have sets of linear rows, some have curved rows, some have vertical rows or some have horizontal rows. The common denominator is that it has fewer keys than the common QWERTY keyboard or the Dvorak keyboard, and that chords are employed, i.e. combinations of keys or sensors, to enter or produce specific letters, numbers, symbols or functions. A good example of a modern one handed chordic keyboard for use by either hand is the BAT, U.S. Pat. No. 5,642,108 to Gopher et al., sold by Infogrip, Inc., 812 North Boulevard, Baton Rouge, La. 70802. The BAT keyboard comprises two sets of keys, seven for the left hand and seven for the right. Various combinations of keys, from either hand, form binary chords which enter letters, numbers, punctuation, etc., into a computer for processing. Other keyboards are available for attachment to personal computers and the like in order to provide additional functions or to increase the speed of data entry.

The patent literature describes a number of efforts to improve the speed and efficiency of data entry on keyboards. For example, U.S. Pat. No. 4,680,572 to Meguire, et al. entitled CHORD ENTRY KEYING OF DATA FIELDS describes a keyboard arrangement, which in one embodiment, has eleven keys arranged in two sets of five, for either hand, and a common enter key located between the two hands. The system permits the entry of data in a chord-like fashion provided that the common function key is depressed during a predetermined time frame prior to or after the depression of the last data key. Efforts to arrange keyboard keys in a vertical fashion is also described in certain prior art literature. U.S. Pat. No. 3,428,747 to Alferieff entitled MAN TO MACHINE COMMUNICATION KEYBOARD DEVICE discloses a keyboard arrangement in which the four digits and thumb of the right and left hands, respectively, are positioned adjacent to two sets of keyboards, each having five keys, that are vertical and substantially adjacent to each other. The keyboard system permits the entry of data into a computer, radio system, interface or the like.

Other keyboard apparatuses and systems of possible relevance include the following U.S. Patents: U.S. Pat. Nos. 329,675; 477,062; 506,718; 578,785; 753,318; 1,293,023; 1,409,386; 1,487,115; 1,733,605; 1,771,953; 1,932,914; 1,936,089; 1,998,063; 2,012,924; 2,028,516; 2,031,017; 2,040,248; 2,150,364; 2,187,592; 2,189,023; 2,190,752; 2,192,594; 2,200,807; 2,282,102; 2,312,138; 2,390,414; 2,428,605; 2,520,142; 2,532,228; 2,581,665; 2,616,198; 2,634,052; 2,641,769; 2,718,633; 2,823,468; 2,850,812; 2,972,140; 3,021,611; 3,022,878; 3,102,254; 3,166,856; 3,184;554; 3,197,889; 3,225,883; 3,234,664; 3,241,115; 3,277,587; 3,369,643; 3,375,497; 3,381,276; 3,428;747; 3,466,647; 3,507,376; 3,526,892; 3,582,554; 3,633,724; 3,675,513; 3,772,597; 3,781,802; 3,798,599; 3,818,448; 3,831,147; 3,831,296; 3,833,765; 3,879,722; 3,929,216; 3,945,482; 3,967,273; 3,970,185; 3,980,823; 3,982,236; 4,042,777; 4,067,431; 4,074,444; 4,132,976; 4,159,471; 4,185,282; 4,333,097; 4,350,055; 4,360,892; 4,467,321; 4,494,109; 4,516,939; 4,655,621; 4,680,572; 4,791,408; 4,804,279; 5,087,910; 5,217,311; 5,281,966; 5,361,083; 5,459,458; 5,486,058; 5,459,458; 5,515,305; 5,642,108, and an IBM Technical Disclosure Bulletin Vol. 18 No. 12 dated May 1976 entitled; DIGITAL X" TYPEWRITER KEYBOARD which discloses two sets of five ergonomically arranged keys for each hand, where each key is operated by one of the ten digits on the left and right hands. The two thumb keys each produce a space. The eight finger keys use a three position switch (down, away and toward) or a five position switch as home row keys. Downward activation produces home row data, away activation produces top alphabetic row data and toward activation produces bottom row data found on the QWERTY keyboard.

While the foregoing all appear to represent improvements in the art of keyboard systems, they nevertheless tend to be difficult to learn and difficult to use, especially by individuals who are sight or hearing impaired. Of all the patents and technologies researched, none use or claim an eight bit binary computer code as a data entry means. The most relevant technology to this patent application is the eight bit EBCDIC computer code (Extended Binary Coded Decimal Interchange Code), the eight bit ASCII and extended ASCII computer code (American Standard Code for Information Interchange) and the eight dot computer braille code, which is top dot configured for tactile reading.

SUMMARY OF THE INVENTION

Briefly described, the invention comprises an eight bit binary code for use as an alternative eight dot braille arrangement and an alphanumeric data entry system and method for chordic eight key or sensor binary keyboards which permits the entry of vowels with a first group of four binary keys or sensors activated by four digits of the first group or preferred left hand, and the entry of consonants with a second group of four binary keys or sensors activated by four digits of the second group or preferred right hand in simultaneous combination with the consonant's preceding binary vowel chord formed or produced on said first group of four binary keys or sensors activated by the four digits of the first group or preferred left hand. The input keyboard comprises eight binary keys or sensors arranged in two sets of four binary keys or sensors each. The first set of four binary keys or sensors is adapted for convenient depression or activation by the preferred thumb, index, middle and ring digits on the four digits of a first group or preferred left hand. Similarly, the second set of four binary keys or sensors is arranged for convenient depression or activation by four digits of a second group by the preferred thumb, index, middle and ring digits on the four digits of a second group or preferred right hand. The two sets of four binary keys or sensors are preferably arranged where each binary key or sensor is located directly beneath the finger tip, of the activating digit, of an ergonomically positioned hand, preferably in two mirror imaged pairs of adjacent crescents or ergonomically correct mirror imaged pairs to best accommodate the natural ergonomically relaxed hand position of the digits on the hands of a data entry keyboard operator. Alternatively, the two sets may be arranged in two vertical rows substantially parallel to each other so that the keyboard can mimic the layout of an 8-dot braille cell character.

The vowels a, e, i, and o are formed or produced by a binary key or sensor of a first set of four binary keys or sensors activated by a first group of four digits of the first preferred left hand from right to left by depressing or activating independently the preferred thumb digit for the "a", the index digit for the "e", the middle digit for the "i" or ring digit for the "o", respectively, of the first group of four digits of the first preferred left hand group against the corresponding binary key or sensor of the first set of four binary keys or sensors. The vowel u is formed or produced by simultaneously depressing or activating the two inside binary keys or sensors of a first set of four binary keys or sensors by the two inside digits, the preferred index and middle of the first group of four digits of the first preferred left hand group. The vowel y is formed or produced by simultaneously depressing or activating the two outside binary keys or sensors of a first set of four binary keys or sensors by the two outside digits, the preferred ring and thumb digits of the first group of four digits of the first preferred left hand group. Consonants are formed or produced by simultaneously forming or producing a binary vowel chord with the first set of four binary keys or sensors by a first group of four digits of the first preferred left hand group and simultaneously depressing or activating the appropriate binary keys or sensors of a second set of four binary keys or sensors with the second group of four digits, the preferred thumb, index, middle or ring digit or digits of the second preferred right hand group. Because the vowels a, e, i, o, u and y are relatively evenly distributed throughout the alphabet, it makes logical sense to form the consonants b, c and d with the depression or activation of a binary key or sensor by the preferred thumb digit of the first preferred left hand group (the vowel a) in simultaneous combination with the depression or activation of a binary key or sensor of a second set of four binary keys or sensors by the index digit for the consonant b, middle digit for the consonant c and ring digit for the consonant d, respectively, of the second group of four digits of the second preferred right hand group.

The system enters or produces the number mode by the simultaneous depression or activation of a second set of four binary keys or sensors by a second group of four digits, the preferred thumb, index, middle and ring digits of the second preferred right hand group in simultaneous combination with the entry or production of the desired specific binary number chord with the four digits on the first group of four digits of the preferred left hand group. The first preferred left hand group digits enter or produce the specific chosen binary number chords between 0 and 9 in a reverse binary abacus chordic fashion with the preferred ring digit binary key or sensor of the first preferred left hand group forming or producing the binary number 1, the preferred middle digit binary key or sensor forming or producing the binary number 2, the preferred index digit binary key or sensor forming or producing the binary number 4, the preferred thumb digit binary key or sensor forming or producing the binary number 8, then using binary combinations of the first set of four binary keys or sensors to produce the desired number. The numbers 10, 11, 12, 13 and 14 are used to produce the common math functions, where the binary number 10 chord produces or represents the addition function, the binary number 11 chord produces or represents the multiplication function, the binary number 12 chord produces or represents the subtraction function, the binary number 13 chord produces or represents the division function and the binary number 14 chord produces or represents the equals function. Functions, up to 15, are obtained or represented by the simultaneous depression or activation of a second set of four binary keys or sensors by three digits of a second group of four digits, the index, middle and ring digits of the second preferred right hand group and the choice of between 1 and 15 binary function mode chords using the previously explained binary abacus number chords with the four digits of the first group of four digits of the first preferred left hand group depressing or activating four binary keys or sensors of the first set of four binary keys or sensors. It is possible to choose a variety of the data entry choices including containment groups, movement chords, operating chords (e.g., reset, space, break, print, etc.), Latin based foreign language vowels, consonants and punctuation, punctuation marks, monetary symbols, symbols and graphics chords, etc.

The eight bit binary code can also be used as a finger braille type of communication by the deaf and blind, where the transmitter transmits the mirror imaged binary data chord from the left hand onto the right hand and the mirror imaged binary data chord from the right hand onto the mirror imaged left hand, so the receiver receives the binary data in its preferred embodiment. This physiological aspect of this method is that the transmitter already knows what they are going to transmit, so they simply switch the four digit binary chords on either hand so that the receiver has the chance to easily process the binary data into words and other types of communication. If an individual is missing a thumb digit, the system can be implemented by using the index, middle, ring and little (pinkie) digit of the left and right hands.

The system is logically developed and implemented so that it is easy to learn and quick to use, especially for those who are handicapped or sight impaired.

These and other features of the present invention will be more fully understood by reference to the following drawings.

BRIEF DESCRIPTION OF THE DRAWINGS

FIG. 2A. is a table illustrating how all the vowels are represented on the first preferred left hand group.

FIG. 2B. is a table illustrating how consonants are formed or produced by grouping them with vowels selected by binary chords on a first set of four data entry binary keys or sensors depressed or activated by the first preferred left hand group with a second set of four data entry binary keys or sensors depressed or activated by the second preferred right hand group.

FIG. 2C. is a table illustrating the binary chord fingering for the first preferred left hand group and second preferred right hand group in order to enter or produce the lower case alphabet letters a through z.

FIG. 2D. is a table illustrating the manner in which the capital letters A through Z and certain punctuation symbols are entered or produced.

FIG. 2E. is a table illustrating the manner in which binary number chords are entered or produced.

FIG. 2F. is a table illustrating the manner in which common binary math function chords are entered or produced.

FIG. 2G. is a table illustrating the manner in which binary function key chords are entered or produced.

FIG. 2H. is a table illustrating the manner in which binary containment chord groups are entered or produced.

FIG. 2I. is a table illustrating the manner in which binary movement chords are entered or produced.

FIG. 2J. is a table illustrating the manner in which system operating chords are entered or produced.

FIG. 2K. is a table illustrating the manner in which certain foreign language vowels and consonants are entered or produced.

FIG. 2L. is a table illustrating the manner in which certain monetary symbols, symbols and graphics binary chords are entered or produced.

FIG. 2M. is a table illustrating how various binary chord groups relate to a corresponding ASCII and extended ASCII 8-bit binary code equivalent.

FIG. 4A. illustrates the manner in which the number 0 is entered or produced.

FIG. 4B. illustrates the manner in which the number 9 is entered or produced.

FIG. 4C. illustrates the manner in which the number 23 is entered or produced.

FIG. 8A illustrates a table showing the code which is received by the receiver.

FIB. 8B illustrates a table showing the mirror image code which is transmitted by the sender.

FIG. 9 illustrates a table of the prior art eight bit binary ASCII code.

FIG. 10 illustrates a table of the prior art eight bit binary extended ASCII code.

Figure 11:
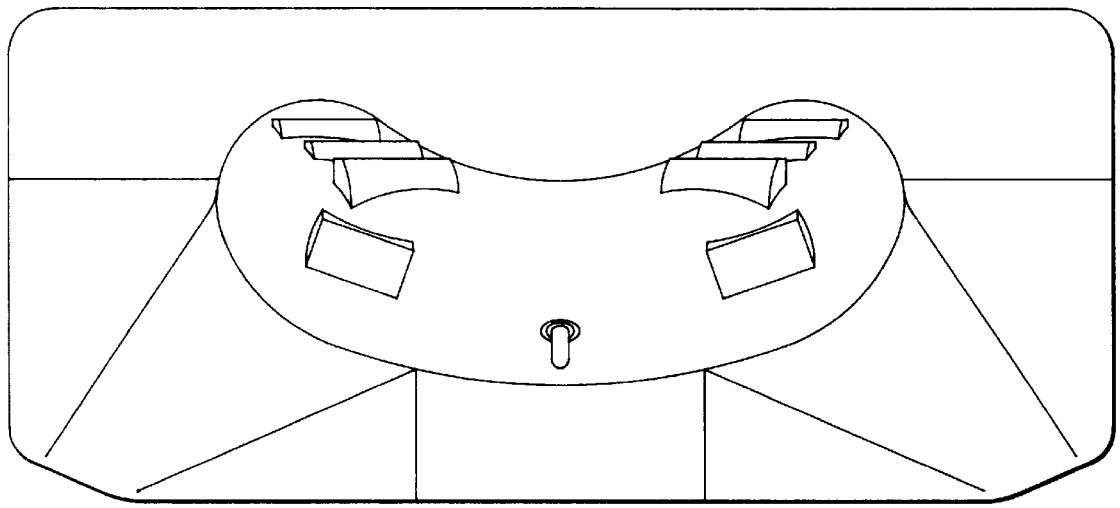

FIG. 11 illustrates a prior art top vertical view of the most ergonomically designed 8-key chord keyboard found in U.S. Design Pat. No. 381,017, issued Jul. 15, 1997.

Figure 12:
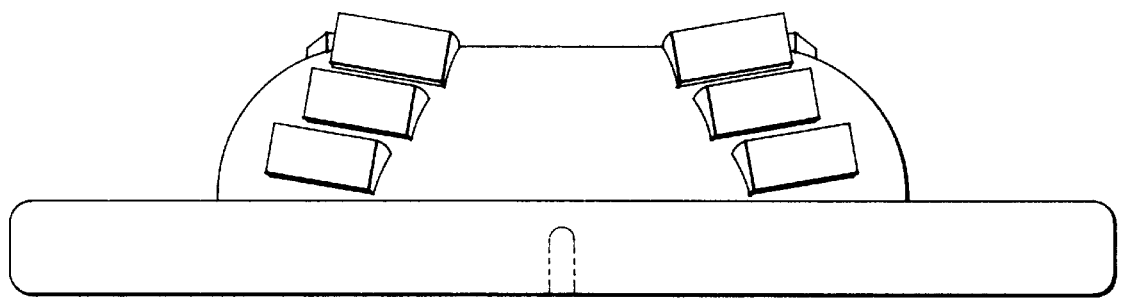

FIG. 12 illustrates a prior art front elevation view of the most ergonomically designed 8-key chord keyboard.

Figure 13:
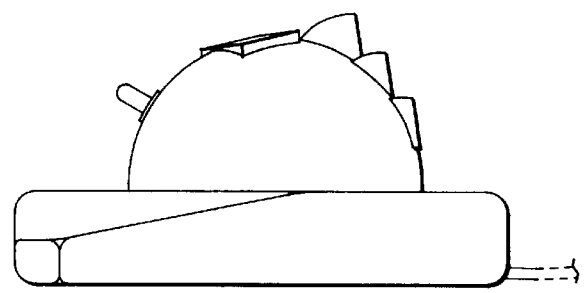

FIG. 13 illustrates a prior art right side view of the most ergonomically designed 8-key chord keyboard.

Figure 14:
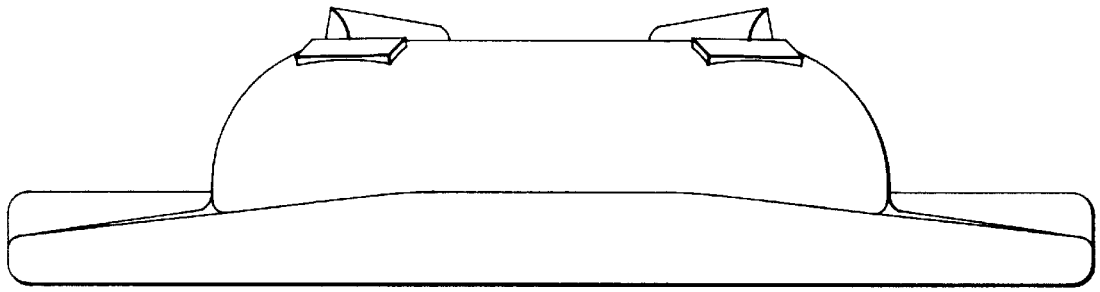

FIG. 14 illustrates a prior art back elevation of the most ergonomically designed 8-key chord keyboard.

Figure 15:
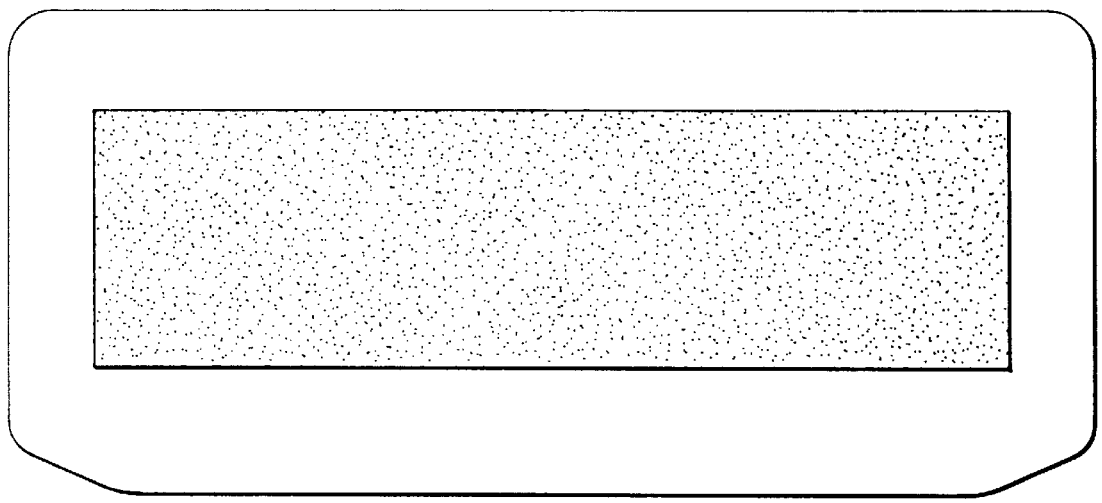

FIG. 15 illustrates a prior art bottom view of the most ergonomically designed 8-key chord keyboard with a non-slip bottom..

Figure 16:
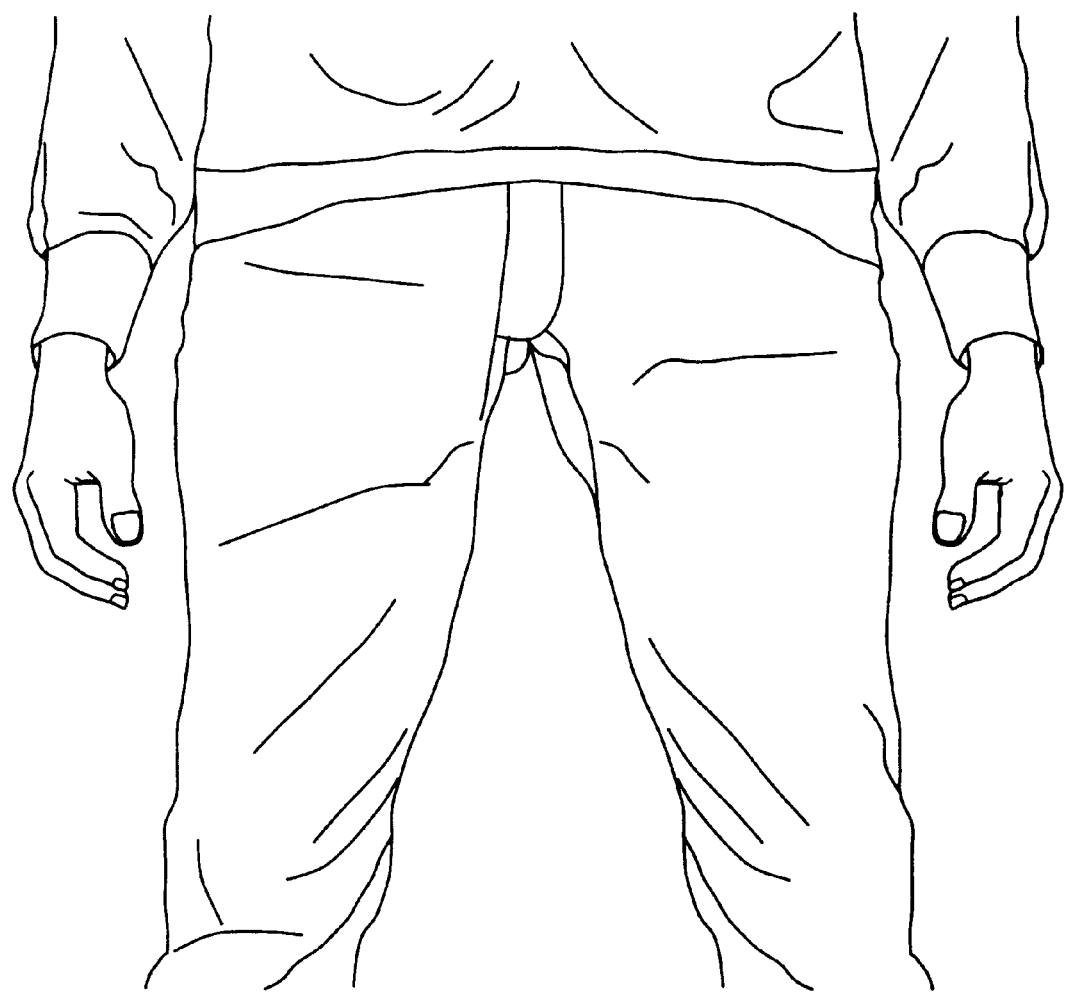

FIG. 16 illustrates a frontal view of a standing human in an ergonomically relaxed position, where the shoulders, arms, hands and digits (fingers) are in their naturally relaxed positions.

Figure 17:

FIG. 17 illustrates the ergonomically relaxed standing body position of FIG. 16, where the arms are bent at the elbows, forming a 90 degree angle, and the forearms are parallel to the ground; where the hands and digits (fingers) remain in the same ergonomically relaxed position of FIG. 17.

Figure 18:
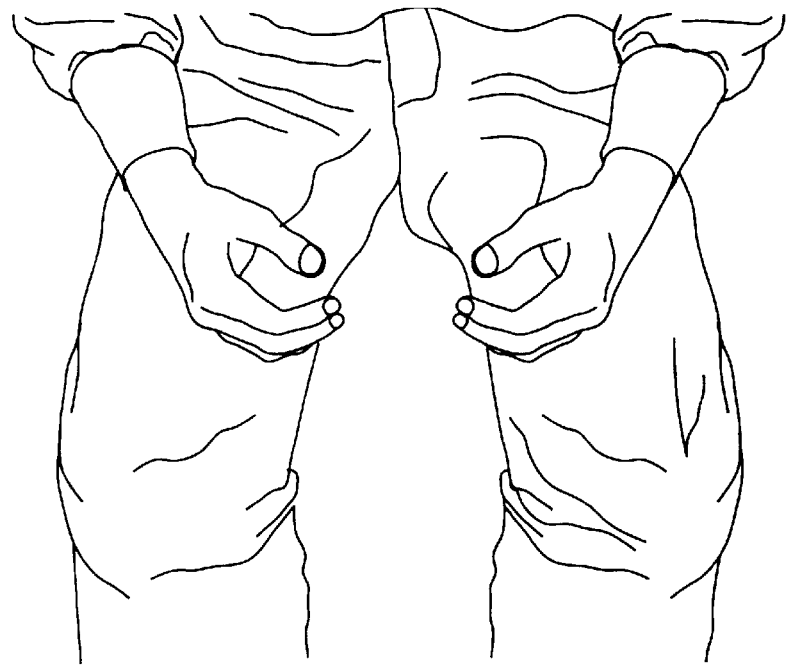

FIG. 18 illustrates a perspective view of FIG. 17, while in the seated position.

Figure 19:
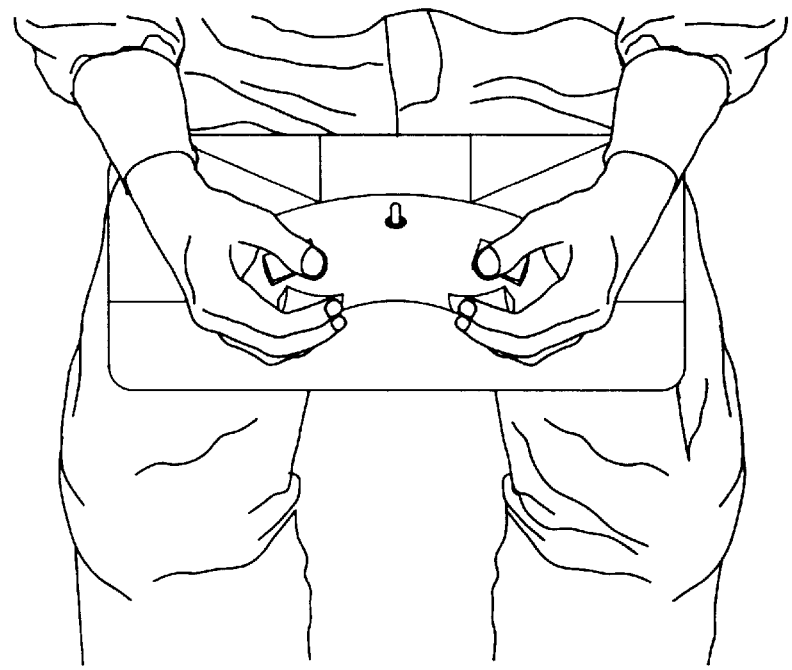

FIG. 19 illustrates a perspective view of FIG. 18, with the most ergonomically designed 8-key chord keyboard of prior art FIGS. 11 through 15 positioned on the seated lap and directly under the ergonomically positioned hands and digits (fingers).

Figure 20:
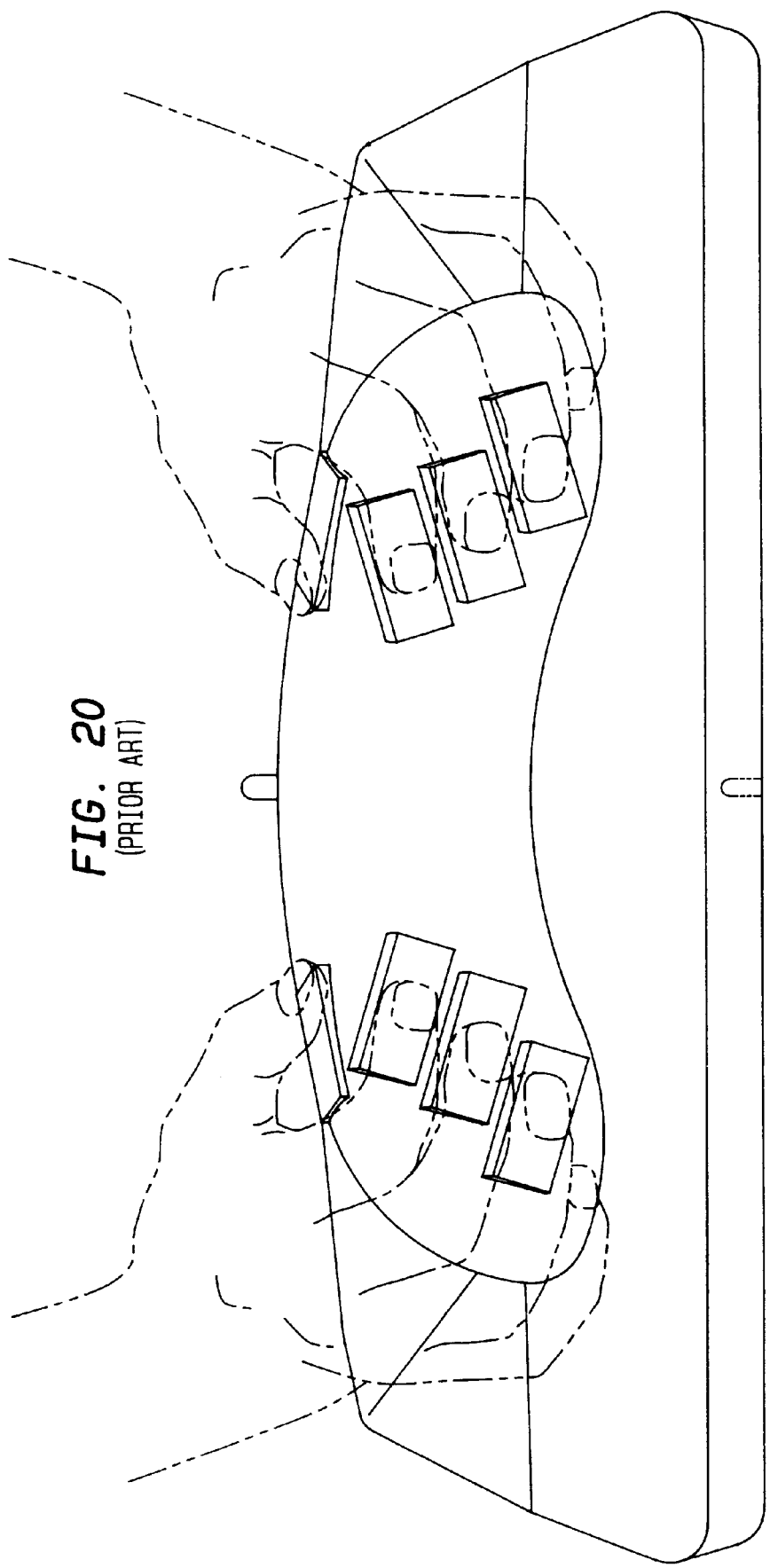

FIG. 20 illustrates a close up perspective view of FIG. 19

Figure 21A:
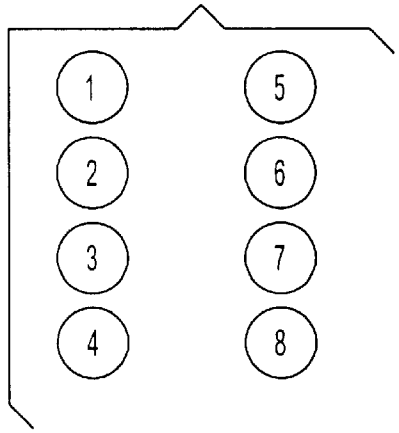

FIG. 21A. illustrates the eight dot braille cell arrangement with individual dot numbering.

Figure 21B:
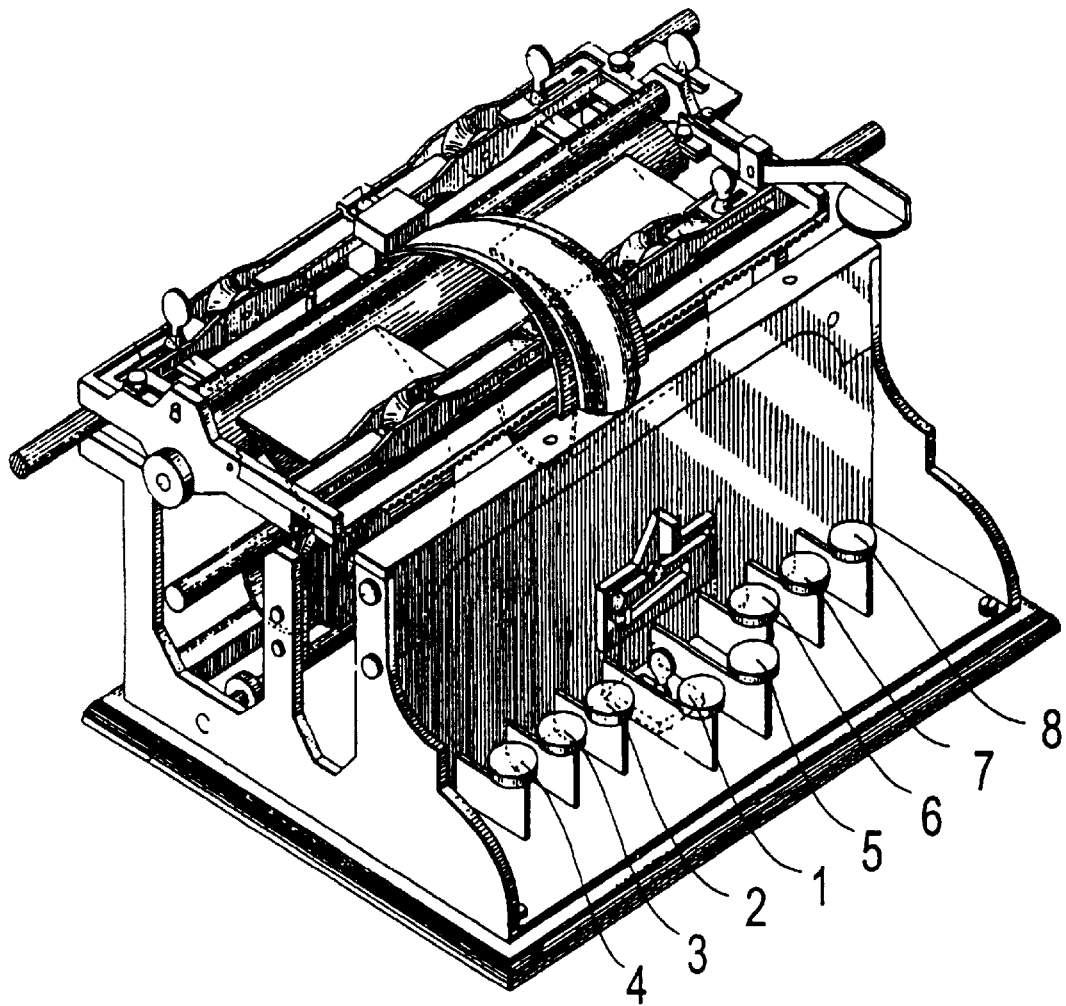

FIG. 21B. illustrates a prior art 8-key braille typewriter.

Figure 22:
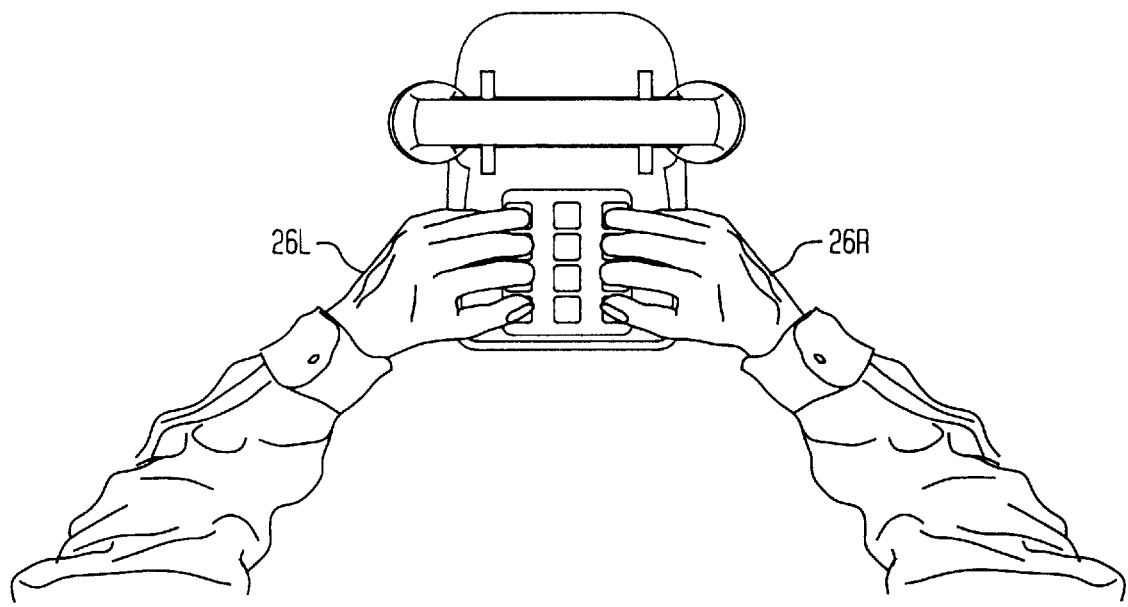

FIG. 22 illustrates a top view of the ergonomically positioned body of FIG. 18, where the thumb, index, middle and ring digits, of the left and right hands, are activating the four left keys and four right keys on the standard prior art twelve button telephone keypad.

Figure 23:
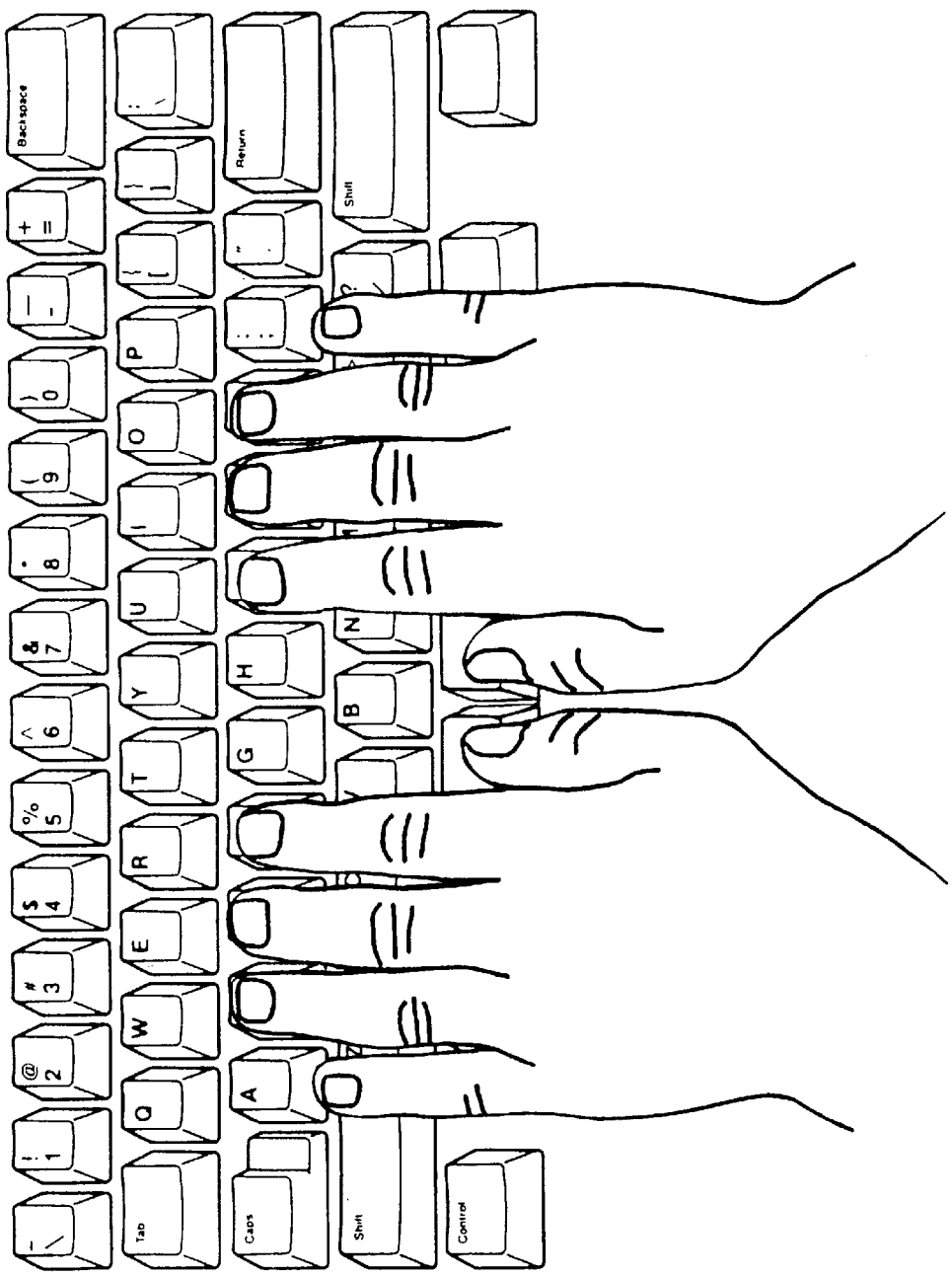

FIG. 23 illustrates a prior art split space bar standard 101-key QWERTY keyboard arrangement operated by the chordic combinations of the thumb, index, middle and ring digits of the left and right hand.

DETAILED DESCRIPTION OF THE PREFERRED EMBODIMENT

During the course of this description, like numbers will be used to identify like elements according to the different figures and tables which illustrate the invention.

Figure 1A:
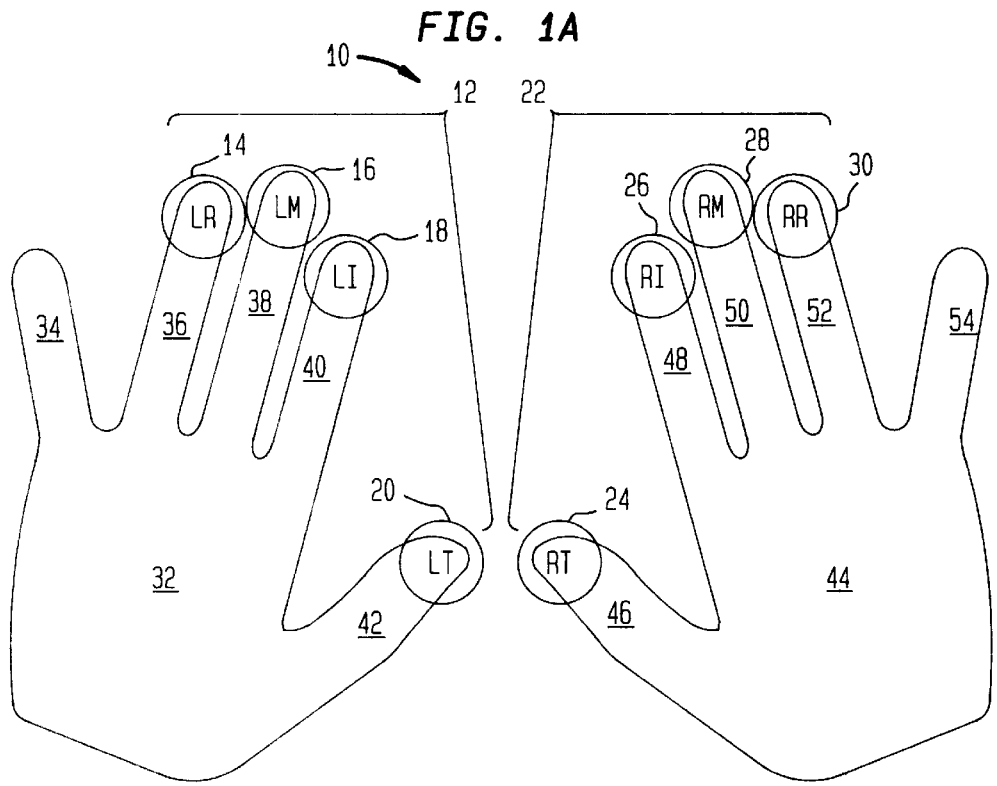
FIG. 1A. illustrates a keyboard layout of the preferred embodiment of the present invention in which the preferred thumb, index, middle and ring digits of the first preferred left hand group manipulate an ergonomically positioned first set of four binary keys or sensors and the preferred thumb, index, middle and ring digits of the second preferred right hand group manipulate an ergonomically positioned second set of four binary keys or sensors.

The layout of the preferred embodiment of the invention 10 is generally illustrated in FIG. 1A. The keyboard system 10 includes eight binary keys or sensors divided up into two sets of four binary keys or sensors each. A first set 12 includes the following four binary keys or sensors 14, 16, 18 and 20 which are preferably adapted to be depressed or activated, respectively, by the ring digit 36, middle digit 38, index digit 40, and thumb digit 42 of the first preferred left hand group 32 of the operator. The little digit 34 of the first preferred left hand group is not used according to the preferred embodiment 10. Similarly, a second set 22 includes the following four binary keys or sensors 24, 26, 28 and 30 which are preferably adapted to be depressed or activated, respectively, by the thumb digit 46, index digit 48, middle digit 50, and ring digit 52 of the second preferred right hand group 44 of the operator. The little digit 54 of the second preferred right hand group is not used, according to the preferred embodiment 10.

Figure 1E:
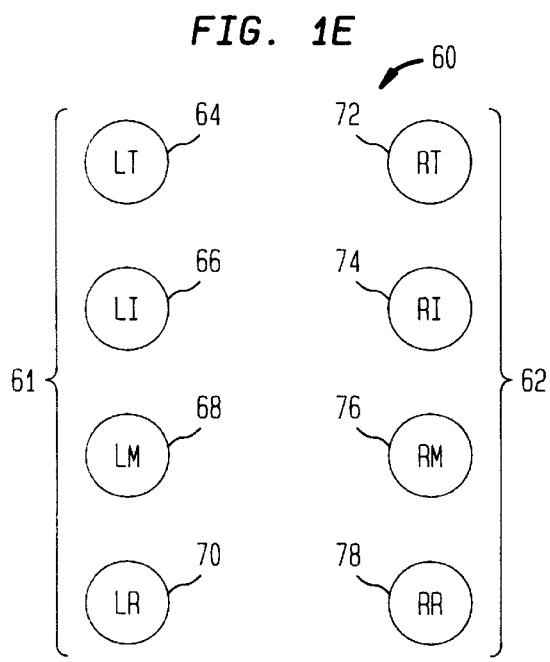
FIG. 1E. illustrates the physical layout of the alternative 8-dot braille system described in the table of FIG. 1D above.
Figures 1B, 1C, 1D:
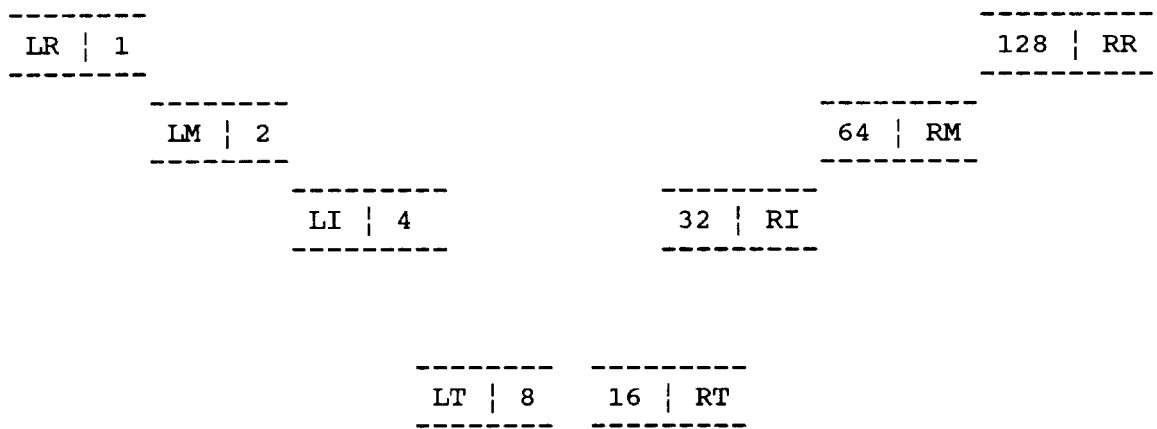
FIG. 1B. is a table illustrating the correspondence between the preferred ring, middle, index and thumb digits of the first preferred left hand group and the second preferred right hand group to eight bit binary numbers in binary octal number notation.
FIG. 1C illustrates in an alternative manner the correspondence between the finger-number presentation and the digits of the first preferred left and second preferred right hand group, respectively, which correspond to the table illustrated in FIG. 1B.
FIG. 1D. is a table illustrating an alternative 8-dot braille arrangement for the two sets of four digit binary keys or sensors each.

FIG. 1B. is a table which illustrates the binary octal number notation represented by the eight binary keys or sensors and FIG. 1C. is another table illustrating the same information in a different format. A useful mnemonic technique is to remember the preferred digit representation is by the phonetic word "TIMR" ("TIMER") which stands for the thumb ("T"), index ("I"), middle ("M"), and ring ("R") digits. For ease of discussion as shown in FIG. 1A., the left ring digit 36 is referred to by the designation LR ("Left-Ring"). Similarly, the following digits have the following representations: left middle digit 38 (LM); left index digit 40 (LI); left thumb 42 (LT); right thumb 46 (RT); right index digit 48 (RI); right middle digit 50 (RM) and right ring digit 52 (RR).

FIG. 1D is a table illustrating an alternative 8-dot braille arrangement for the two sets in two substantially parallel rows of four binary keys or sensors each. FIG. 1E illustrates the physical layout of the alternative 8-dot braille system described in FIG. 1D above. According to the alternative 8-dot braille system 60, the two sets of four binary keys or sensors each, 61 for the first preferred left set and 62 for the second preferred right set, are arranged in two substantially parallel vertical rows. The first set 61 incorporates a row of four binary keys or sensors 64, 66, 68 and 70 which are adapted for use by a first preferred left hand group by using the preferred left thumb digit 42 (LT); left index digit 40 (LI); left middle digit 38 (LM) and left ring digit 36 (LR), respectively. Similarly, the second set 62, incorporates a row of four binary keys or sensors 72, 74, 76 and 78 which are adapted, respectively, for use by a second preferred right hand group by using the preferred right thumb digit 46 (RT); right index digit 48 (RI); right middle digit 50 (RM), and right ring digit 52 (RR). When used as a form of binary braille finger spelling for the deaf and blind, two individuals face each other, and place their hands in the following touching arrangement: transmitters left hand to receivers right hand and transmitters right hand to receivers left hand, thumb to thumb, digit to digit, etc. When transmitting data, the transmitter transmits binary hand chords from the preferred left hand group to the right hand group and from the preferred right hand group to the left hand group. For example, when transmitting the lower case letter b chord (0001 0100), the transmitter transmits the mirror image binary chord upper case vowel E (0010 1000). The receiver will then receive the lower case letter b. The technique for producing vowel and consonant binary chords is explained in further detail below.

Figure 1F:
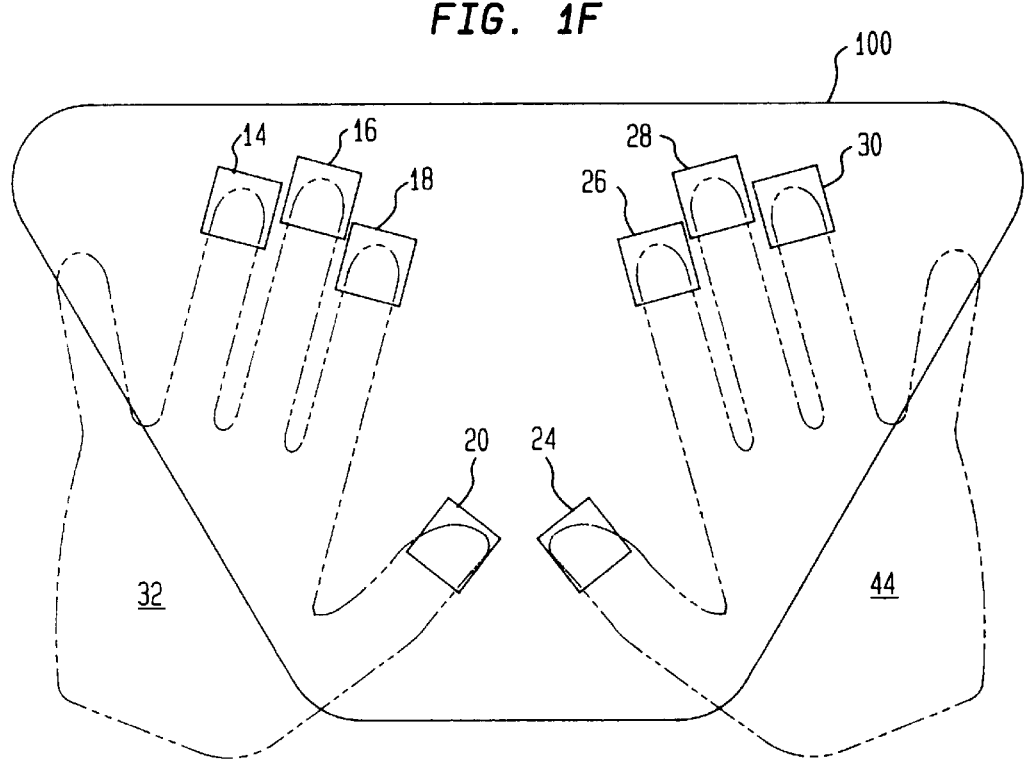
FIG. 1F. illustrates an integrated keyboard layout according to the preferred embodiment of the present invention with the hand positions illustrated in phantom.

The binary keys or sensors 14–20 and 24–30 may be formed or produced in two separate sets 12 and 22 as shown according to the preferred embodiment of the invention in FIG. 1A. Alternatively, the binary keys or sensors 14–20 and 24–30 can be integrated into a single keyboard 100 as shown in FIG. 1F. Hand groups 32 and 44 are illustrated in phantom to show their natural ergonomic position above the integrated keyboard 100.

All binary vowel chords are created or produced with the first set of four binary keys or sensors by the first preferred left hand group 32 according to the table illustrated in FIG. 2A. The vowels a, e, i and o are entered or produced by independently depressing or activating, respectively, the four binary keys or sensors 20, 18, 16 or 14 of the first set 12 by the preferred thumb digit 42 (LT), the index digit 40 (LI), the middle digit 38 (LM), or the ring digit 36 (LR) on the first preferred left hand group, respectively. The vowel u is formed or produced by simultaneously depressing or activating the two inner binary keys or senors by the middle digit 38 (LM) and the index digit 40 (LI). These are the two inside digits of the first preferred left hand group 32 and is logically suggestive of the vowel u used in sign language for the deaf. The occasional vowel y is formed or produced by simultaneously depressing or activating the two outside digits 36 (LR) and 42 (LT). These are the two outside digits of the first preferred left hand group 32 and is logically suggestive of the vowel y used in sign language for the deaf.

All consonants are represented or produced by a second set of four binary keys or sensors by depression or activation with the second preferred right hand group binary chords in simultaneous combination with binary vowel chords formed or produced on the first set of four binary keys or sensors by the first preferred left hand group. The vowel/consonant groupings are illustrated in the table in FIG. 2B. The keyboard system 10 takes advantage of the fact that the vowels a, e, i, o, u and y are somewhat evenly distributed throughout the alphabet separated by either three or five consonants in each case. There are five consonants following the vowels i and o. In the vowel i binary consonant chord grouping, the consonants 1, m and n are the consonants more frequently used, and in the vowel o binary consonant chord grouping, the consonants r, s and t are the consonants more frequently used. Therefore, the consonants j, k and p, q are given an extra binary bit each for their second preferred right hand group binary consonant chords. FIG. 2C. is a table summarizing the manner in which lower case English language alphabet letters a through z are formed or produced; either by use of the first set of four binary keys or sensors depressed or activated by the first preferred left hand group exclusively (in the case of forming or producing vowels), or through the use of the first set of four binary keys or sensors depressed or activated by the first preferred left hand group in simultaneous combination with the second set of four binary keys or sensors depressed or activated by the second preferred right hand group (in order to form or to produce consonants).

Capital letters are formed or produced according to the table illustrated in FIG. 2D. Independent activation of the first preferred right thumb binary key or sensor 46 (RT) produces a space. The first preferred right thumb binary key or sensor 24 becomes the shift key when entering or producing vowels or consonants, in order to form or produce upper case capital letters. Also, as shown in the table in FIG. 2D, punctuation marks (.,?!) are entered or produced with only the second set of four binary keys or sensors depressed or activated by the second preferred right hand group. The logic behind using the second preferred right hand group 44 only is that most punctuation occurs at the far right end of a group of words or a sentence.

FIG. 2E. is a table illustrating the manner in which binary number chords are formed or produced. In order to enter or produce a number, the operator substantially simultaneously depresses or activates all four binary keys or sensors 24, 26, 28 and 30 of a second set of four binary keys or sensors depressed or activated with the preferred digits 46, 48, 50 and 52 of the second preferred right hand group 44 and selects the desired binary number chord for entry with the first set of four binary keys or sensors depressed or activated by the first preferred left hand group. An unused feature of the keyboard system 10 according to the preferred embodiment is that the individual numbers are entered or produced in reverse binary notation starting with the first preferred ring digit 36 (LR) of the first preferred left hand group 32 and ending with the eighth preferred ring digit 52 (RR). If no binary keys or sensors of the left set 12 are depressed or activated, then the number "0" is entered or produced. Depression or activation of the far left first binary key or sensor 14 by the left ring digit 36 (LR) enters produces the number 1, assuming, of course, that all of the binary keys or sensors 24, 26, 28 and 30 of the second preferred right set of four binary keys or sensors 22 are substantially simultaneously depressed or activated. In this fashion it is possible to enter or produce the individual numbers 0 through 9 by the simultaneous binary chordic depression or activation of all of the four binary keys or sensors of the second set 22 along with the appropriate depression or activation of one or more binary keys or sensors of the first set 12 in a reverse binary fashion to produce the desired binary number. The reason that a reverse binary fashion is chosen is that it is more common to read Latin based alphanumeric data from left to right in the same fashion that letters in words are read in the English language. This keeps the data entry system and method consistent in its format and is an easier way for people to learn to enter information into the system 10.

Common binary math function chords are illustrated in the table of FIG. 2F. The reverse binary equivalents of the numbers 10 through 14 are used, respectively, by the number 10 binary chord to represent or produce the addition (+) symbol or function, the number 11 binary chord to represent or produce the multiplication (×) symbol or function, the number 12 binary chord to represent or produce the subtraction (−) symbol or function, the number 13 binary chord to represent or produce the division (/) symbol or function and the number 14 binary chord to represent or produce the equals (=) symbol or function.

In order to expand the utility of the system, it is important to be able to choose from other function modes. Multifunction binary chord choices are entered or produced according to the table illustrated in FIG. 2G. The multifunction binary chord mode choice is initiated or produced by the substantially simultaneous depression or activation of a second set of four binary keys or sensors depressed or activated by the preferred index digit 48 (RI), middle digit 50 (RM) and ring digit 52 (RR) of the second preferred right hand group 44, in simultaneous combination with the appropriate reverse binary choice of chords on a second set of four binary keys or sensors depressed or activated by the four digits of the first preferred left hand group 32. Up to 15 function mode choices are possible (F1–F15) given the fact that there are four binary keys or sensors and 15 different distinct binary chordic combinations possible, given the particular binary chordic choice. Note that the functions F1–F15 correspond one for one with the reverse binary number chosen while in the number mode by the four digits of the first preferred left hand group 32.

Additional instructions can be entered or produced by the keyboard system 10 according to the preferred embodiment which are consistent with instructions that also can be entered or produced with the QWERTY keyboard, Dvorak keyboard , or other types of Latin based alphabet foreign language keyboard such as the Spanish, French, German, Italian, Swedish/Finnish, Canadian bilingual along with many other types of Latin based alphabet keyboards known to those of ordinary skill in the art. For example, the table in FIG. 2H illustrates certain binary containment chord groups that have mirror image binary chords. Containment groups are instructions like brackets [ ], parentheses ( ), etc. It is also useful to provide the common movement instructions such as moving a cursor up or down, tab, home,. page up or down, etc. These binary movement chords are formed or produced according to the table illustrated in FIG. 2I.

Standard operating and control instructions are generated according to the table illustrated in FIG. 2J. Those operating instructions include, but are not limited to: reset, space, backspace, GO TO, break, tab, start and end of text, print, print, inquiry, substitution, figure shift, alternate, carriage return, scroll, shift, etc.

It is also possible to use the keyboard system 10 to form or produce vowels, consonants and punctuation in foreign Latin based languages. The table in FIG. 2K illustrates the manner in which common characters in foreign languages are formed or produced according to the preferred keyboard system 10 of the present invention.

Finally, specialty symbols such as monetary symbols (Pound, Franc, Rupee, etc.); special symbols (Pi, &, @, etc.); or graphic instruction binary chords (shaded, lightened, underlined, etc.) can be formed or produced according to the instructions illustrated in the table in FIG. 2L.

Because there are a total of eight binary keys or sensors, it is possible to form a total of 256 binary combinations (2*2*2*2*2*2*2*2=256). Those combinations are summarized in the table illustrated in FIG. 2M. If activation of the shifting binary keys or sensors chord is employed, it offers the possibility of a secondary set of 255 unassigned eight bit binary chord groups which can be used for a multiplicity of modes, such as different size fonts, bold, italics, underline, highlight, etc., a feature which substantially expands the capability of the system 10.

Figure 3A:
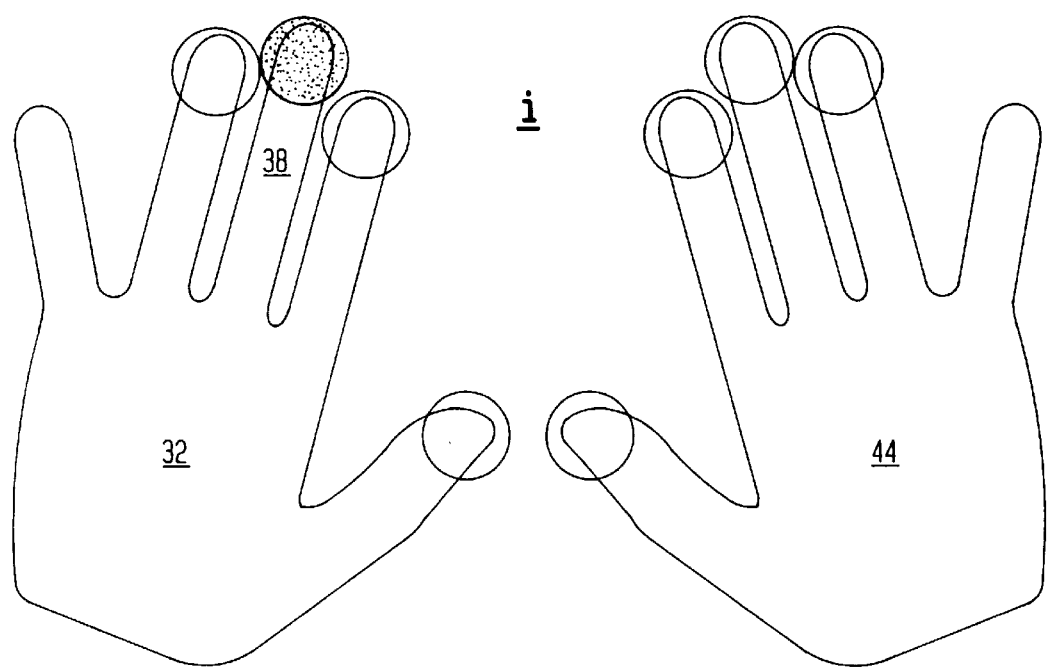
FIG. 3A. illustrates graphically how the four digits of the first preferred left hand group enter or produce the lower case letter i.
Figure 3B:
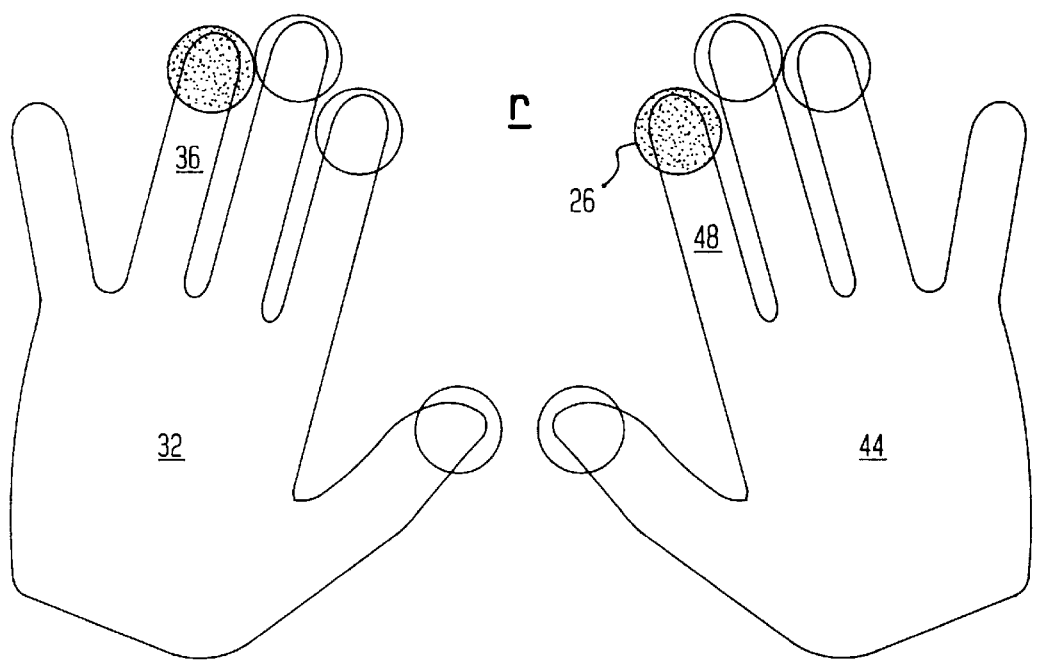
FIG. 3B. illustrates graphically how a binary vowel chord entered or produced by a digit on the first preferred left hand group in simultaneous combination with a data entry binary key or sensor selected by a finger on the second preferred right hand group enters or produces the lower case letter r.
Figure 3C:
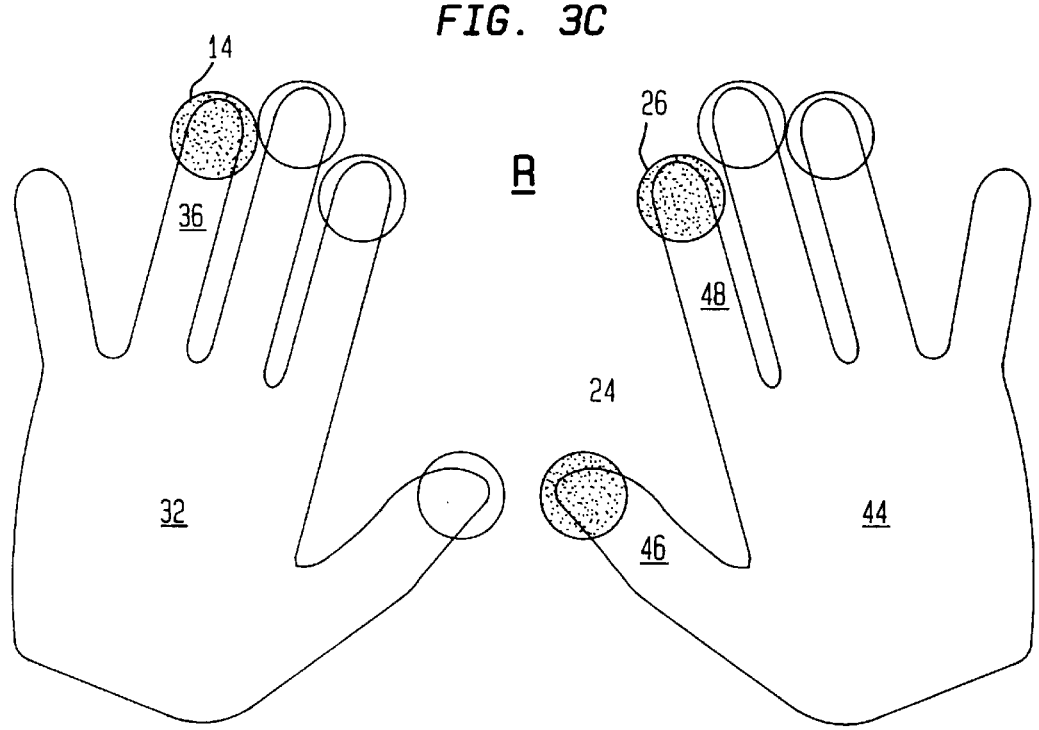
FIG. 3C. illustrates the manner in which depression or activation of the four binary keys or sensors by the digits on the first preferred left hand group and second preferred right hand group select the upper case letter R.

In order to more fully understand the invention, FIGS. 3A–3C illustrate the manner in which certain specific letters are formed or produced. The lower case letter i is illustrated graphically in FIG. 3A. The first preferred left hand group 32 and the second preferred right hand group 44 positions, respectively, are shown in outline above the eight binary keys or sensors. The letter i, because it is a vowel, is simply formed or produced by the depression or activation of the second digit, the preferred middle digit 38 (LM) corresponding to the binary key or sensor 16 of the first set of four binary keys or sensors 12 which is shown by the blackened dot in FIG. 3A. This would, of course, correspond to the depression or activation of binary key or sensor 68 in the 8-dot braille alternative embodiment 60 illustrated in FIGS. 1D and 1E.

FIG. 3B illustrates the manner in which the lower case consonant binary chord r is formed or produced. This is, of course, formed or produced according to the table illustrated in FIG. 2C which shows that the first digit, the preferred ring digit 36 (LR) of the first preferred left hand group 32 depresses or activates binary key or sensor 14 (which otherwise would form the vowel o) in simultaneous combination with the index digit 48 (RI) of the second preferred right hand group 44 which depresses or activates binary key or sensor 26 of the second group of four binary keys or sensors 22.

The capital letter R is formed or produced as shown in the illustration of FIG. 3C and according to the instructions in the table of FIG. 2D. Again, the first digit, the preferred left ring digit 36 (LR) of the first preferred left hand group 32 depresses or activates binary key or sensor 14 (which would otherwise, by itself, produces the letter o) in simultaneous combination with the depression or activation of the thumb binary key or sensor 24 by the fifth digit, the preferred thumb digit 46 (RT) of the second right hand group 44 and the index digit binary key or sensor 26 by the sixth digit, the preferred index digit 48 (RI) of the second preferred right hand group 44.

Figure 3D:
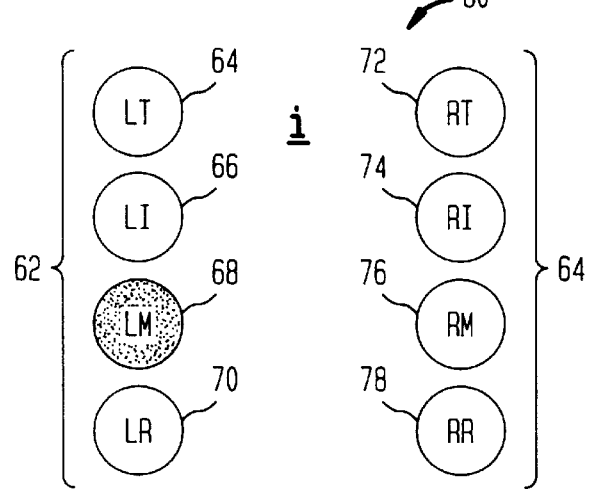
FIG. 3D. illustrates how the digits of the first preferred left hand group select the lower case letter i according to the alternative 8-dot braille system described in FIGS. 1D and 1E.
Figure 3E:
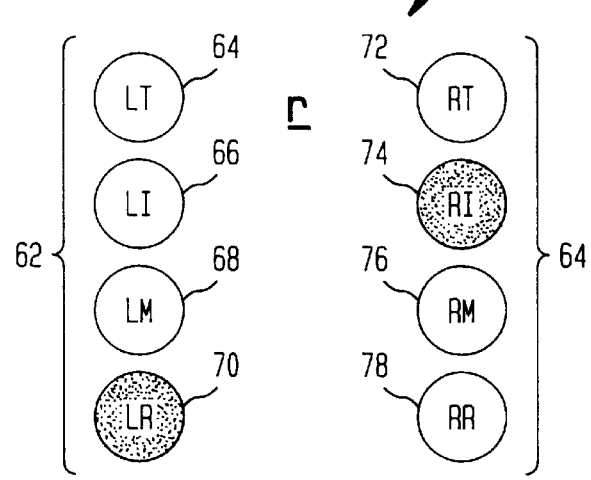
FIG. 3E. illustrates how a binary vowel chord selected by a digit on the first preferred left hand group in simultaneous combination with a data entry binary key or sensor entered or produced by a finger of the second preferred right hand group enters or produces the lower case letter r according to the alternative 8-dot braille system described in FIGS. 1D and 1E.
Figure 3F:
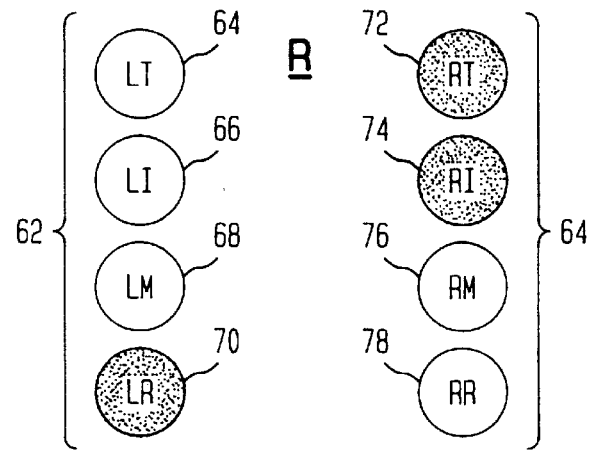
FIG. 3F. illustrates the manner in which depression or activation of the four binary keys or sensors by the four digits on the first preferred left and second preferred right hand groups enters or produces the upper case letter R according to the alternative 8-dot braille system described in FIGS. 1D and 1E.

The letters i, r and R can also be easily formed or produced on the alternative 8-dot braille system according to the table illustrated in FIG. 1D. and on the binary key or sensor arrangement in FIG. 1E. As shown in FIG. 3D, the letter i is formed or produced using the alternative 8-dot braille system illustrated in FIG. 1D by depressing or activating binary key or sensor 68 with the second digit, the preferred left middle finger 38 (LM). Similarly, the letter r is formed or produced by depressing or activating binary keys or sensors 70 and 74 with the first digit, the preferred left ring finger 36 (LR) and the sixth digit, the preferred right index finger 48 (RI). Lastly, the capital letter R is formed or produced by depressing or activating binary keys or sensors 70, 72 and 74 with the first digit, the preferred left ring finger 36 (LR) in simultaneous combination with the fifth digit, the preferred right thumb digit 46 (RT) and the sixth digit, the preferred right index finger 48 (RI), respectively.

FIGS. 4A–4C illustrate, respectively, the manner in which the numbers 0, 9 and 23 are entered or produced. The number 0 is entered or produced, as shown in FIG. 4A, merely by the simultaneous depression or activation of all of the binary keys or sensors 24, 26, 28 and 30 of the second set 22 or by the preferred four digits 46, 48, 50 and 52 of the second preferred right hand group 44 along with none of the binary keys or sensors of the first set of four binary keys or sensors 12 or by the first preferred left hand group 32.

The number 9 is entered or produced by depressing or activating all the four binary keys or sensors 24, 26, 28 and 30 of the second set 22 by the preferred four digits 46, 48, 50 and 52 of the second preferred right hand group 44 along with depressing or activating the binary keys or sensors 14 and 20 of the first set of four binary keys or sensors 12 with the digits 36 (LR) and 42 (LT) of the first preferred left hand group 32 according to the instructions in the table of FIG. 2E.

As shown in FIG. 4C, the number 23 is formed or produced by entering or producing the number 2 and the number 3 in sequence. The number 2 is entered or produced by depressing or activating all of the four binary keys or sensors of the second set 22 along with the depression or activation of the binary key or sensor 16 by the preferred middle digit 38 (LM) of the first preferred left hand group 32. The operator then removes all digits from both sets of four binary keys or sensors 12 and 22 and then depresses or activates all binary keys or sensors of the second set 22 with the four digits of the second preferred right hand group 44 while depressing or activating binary keys or sensors 14 and 16 with the preferred ring digit 36 (LR) and middle digit 38 (LM) of the first preferred left hand group 32 to form the number 3. This will enter or produce the number 23 into the keyboard system 10.

Figure 5:
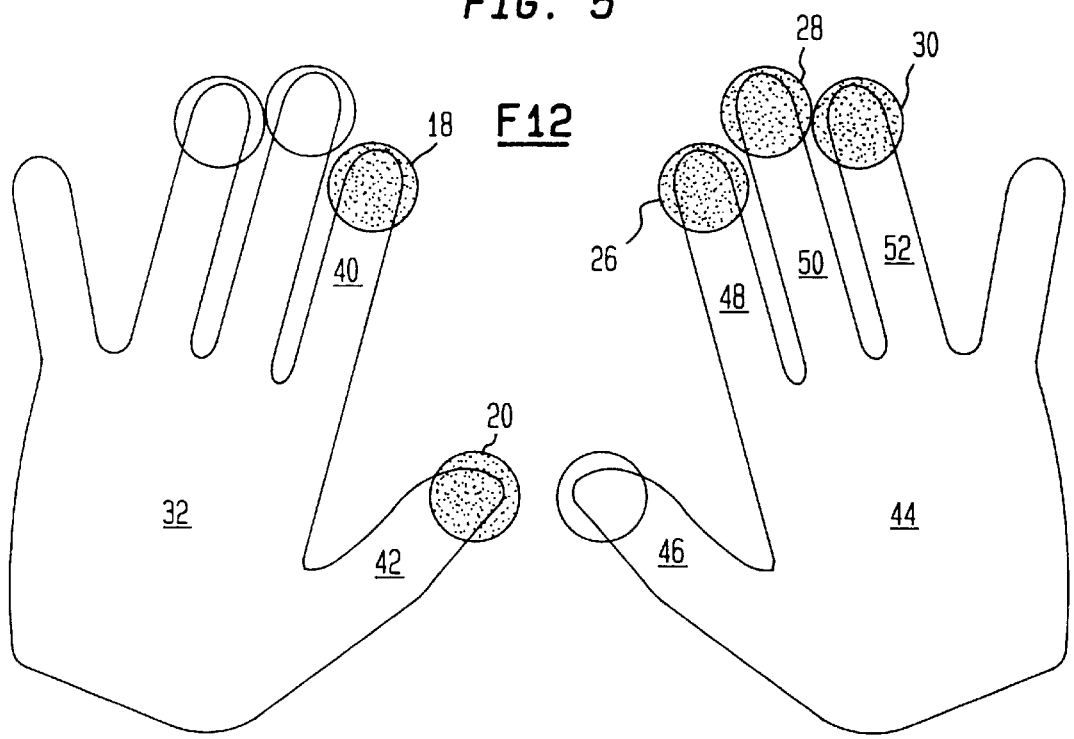
FIG. 5 illustrates how the function mode F12 is entered or produced.
Figure 6:
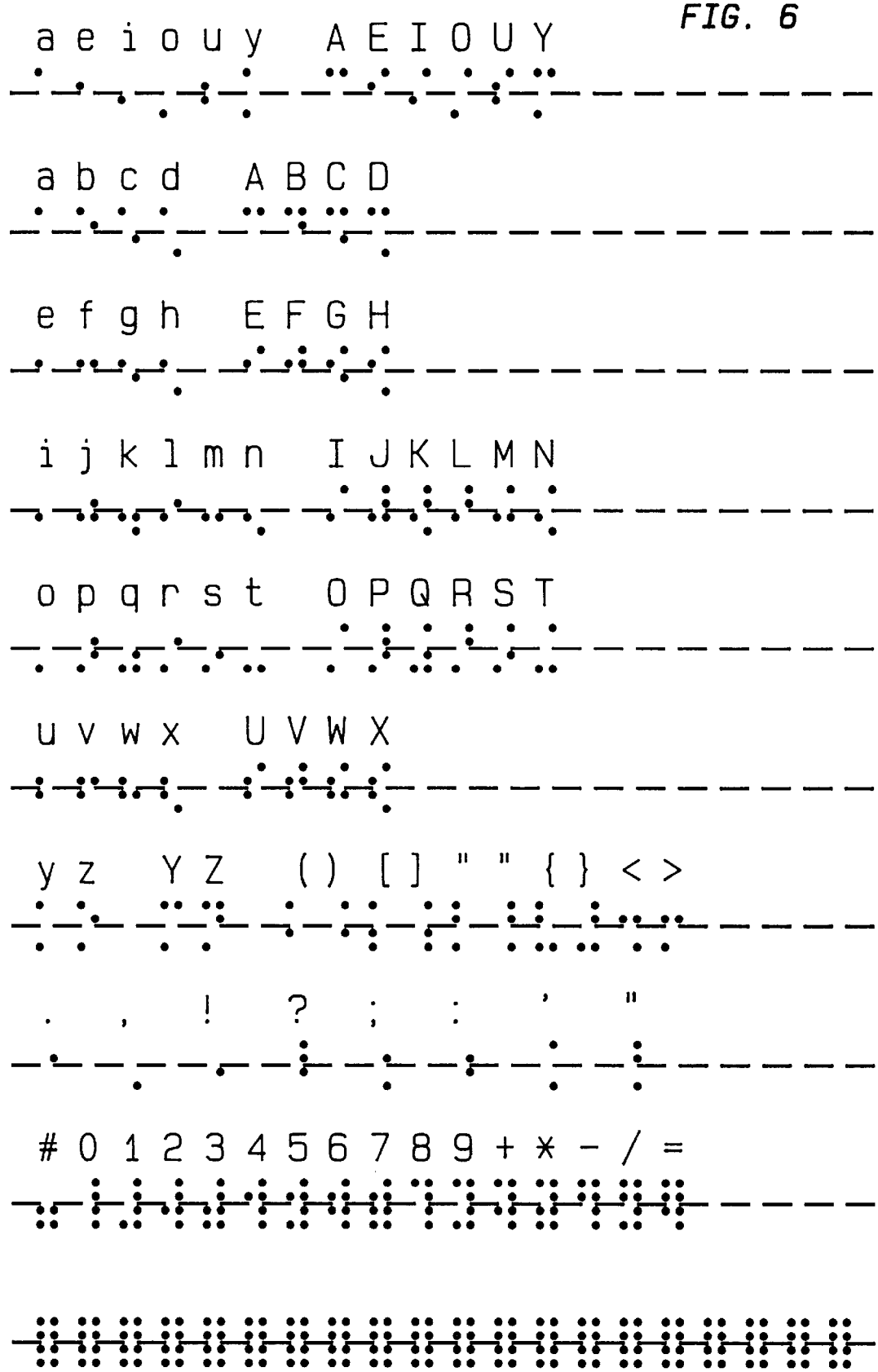
FIG. 6 illustrates the 8-bit binary code represented in an 8-dot braille arrangement with a tactile separator positioned between dots 6 & 7 and dots 2 & 3 for tactile braille reading.
Figure 7:
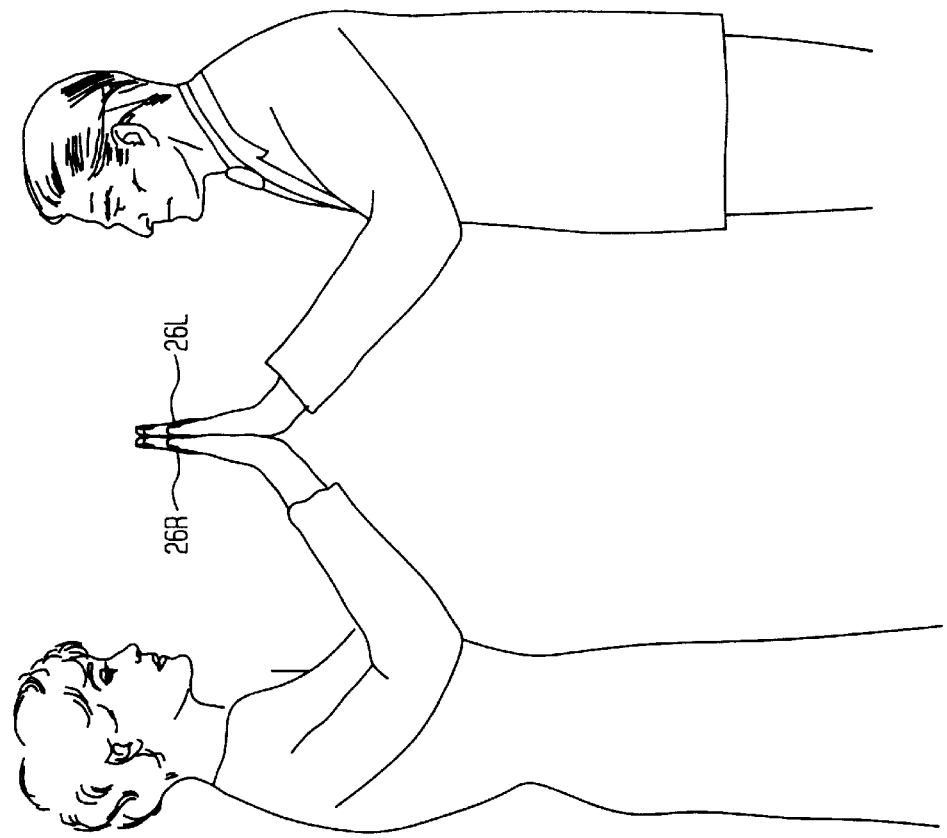
FIG. 7 illustrates a manner in which two individuals, facing each other, can communicate using the eight bit binary code as a finger braille type of communication by the deaf and blind, where the transmitter transmits the mirror imaged binary data chord from the left hand onto the right hand and the mirror imaged binary data chord from the right hand onto the mirror imaged left hand, so the receiver receives the binary data in its preferred embodiment.

The function F12 is entered or produced according to FIG. 5 and the instructions found in the table illustrated in FIG. 2G. Initially, the operator depresses or activates the binary keys or sensors 26, 28 and 30 with the index 48 (RI), middle 50 (RM) and ring 52 (RR) digits of the second preferred right hand group 44. Substantially simultaneously, the operator depresses or activates binary keys or sensors 18 and 20 of the first set of four binary keys or sensors 12 with the index 40 (LI) and thumb 42 (LT) digits of the first preferred left hand group 32. This is, of course, the reverse binary notation for the number 12.

The system 10 can use a variety of different keyboards, including some that are already on the market. For example, the one handed BAT chord keyboard, U.S. Pat. No. 5,642, 108 described in the related art section of this specification can be employed simply by disabling the little digit keys used by fingers 34 and 54, and tying together the three thumb keys used by the left thumb 42 so they work as one binary key, and the same for the three thumb keys used by the right thumb 46. Other known keyboards can also be employed for the same purpose as long as information is forwarded to a word processor or computer according to the table summarized on FIG. 2M. The most convenient way to employ the improved keyboard system 10 is to provide an interface or software which translates the octal eight digit binary code into a standard computer code such as ASCII and extended ASCII or EBCDIC which a conventional computer will recognize. This can be done external to the computer through a hardwired interface or internal to the computer through an electronic interpreter or a software program according to the translation instructions in the table in FIG. 2M and according to techniques that are very well known to those of ordinary skill in the art.

In summary, the improved keyboard using an eight bit binary code data entry system 10 according to the preferred and alternative embodiment of the invention is relatively easy to learn and very easy to use, especially by handicapped and sight impaired individuals. The vowels, consonants and numbers are formed or produced in a unique and logical way that makes them easy to learn and remember and also quick to implement. Other features and functions of the invention achieve the same result.

While the invention has been described with reference to the preferred embodiment thereof, it will be appreciated by those of ordinary skill in the art that various modifications can be made to the system and method of the invention without departing from the spirit and scope of the invention as a whole.

A portion of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

I claim:

1. An eight bit binary code used as a data entry system for a binary eight key or sensor chordic keyboard consisting of:

a first set of four binary sensors for use by four digits of a first hand group; and, means for producing a vowel whenever at least one of said four binary sensors of said first set of four binary sensors is activated by a digit of said first hand group, combined with an unused second set of four binary sensors for a second hand group.

2. The eight bit binary code used as a data entry system of claim 1 further comprising:

a said second set of four binary sensors for use by four digits of a second hand group, wherein activation of at least one of said binary sensors of said second set of four binary sensors by a digit of said second hand group in simultaneous combination with the desired consonant's preceding vowel representation produced on at least one of said four binary sensors of said first set of four binary sensors produces a consonant.

3. The eight bit binary code used as a data entry system of claim 1, wherein said first set of four binary sensors is located for use by four digits, the thumb, index, middle and ring digits of the said first hand group.

4. The eight bit binary code used as a data entry system of claim 2, wherein said second set of four binary sensors is located for use by four digits, the thumb, index, middle and ring digits of the said second hand group.

5. The eight bit binary code used as a data entry system of claim 3, wherein numbers are assigned binary abacus numeric values and are produced from left to right starting with the left most binary digit, the said ring digit of the said first hand group, as the lowest positive binary integer and progressing towards the said thumb digit of the said first hand group producing numbers in a reverse binary code fashion.

6. The eight bit binary code used as a data entry system of claim 5 wherein said data entry system is shifted to a numeric mode when the said four digits, the thumb, index, middle and ring digits of the said second hand group, activate all of the four binary sensors of said second set of four binary sensors, and wherein numbers are produced in accordance with claim 5, in a reverse binary fashion with the said ring, middle, index and thumb digits of the said first hand group activating or depressing said first set of four binary sensors.

7. The eight bit binary code used as a data entry system of claim 5 wherein said system is shifted to a numeric multifunction mode by the substantially simultaneous activation of the three highest binary valued binary sensors of said second set of four binary sensors by the said index, middle and ring digits of the said second hand group and wherein multifunction mode binary numbers are produced in a said reverse binary fashion with the said ring, middle, index and thumb digits of the said first hand group in accordance with claim 5.

8. The eight bit binary code used as a data entry system of claim 1 wherein the vowel u is produced by the substantially simultaneous activation of the two inner binary sensors of the said first set of four binary sensors by the said two inner middle and index digits of the said first hand group of four digits.

9. The eight bit binary code used as a data entry system of claim 1 wherein the vowel y is produced by the substantially simultaneous activation of the two outer binary sensors of the said first set of four binary sensors by the said outer ring and thumb digits of the said first hand group of four digits.

10. The eight bit binary code used as a data entry system of claim 2 wherein said eight sensor chordic binary keyboard comprises a said first set of four binary sensors and a said second set of four binary sensors arranged in two rows in a substantially parallel and mirror imaged vertical fashion simulating an 8-dot braille cell arrangement.

11. The system of claim 1 wherein said first set of four binary sensors produces vowels, when used in simultaneous combination with an unused second set of four binary sensors, produces a logical four left bit combined with a four right bit readable eight bit binary code arrangement operating system.

12. The system of claim 2 wherein said first set of four binary sensors produces vowels, and said second set of four binary sensors produces consonants, when used in simultaneous combination with the consonants preceding vowel representation produced on said first set of four binary sensors, producing a logical four left bit combined with a four right bit readable eight bit binary code arrangement operating system.

13. A method of producing eight bit binary data into an apparatus consisting of a first set of four binary sensors for use by a first hand group and a second set of four binary sensors for use by a second hand group, said method comprising the step of:

producing a vowel by activating at least one of the binary sensors of said first set of four sensors with at least one digit from said first hand group.

14. The method of claim 13 further comprising the step of:

producing a consonant by activating at least one of the said binary sensors of said second set of four binary sensors with at least one digit of said second hand group in simultaneous combination with the activation of at least one of the said binary sensors of said first set of four binary sensors that produces the consonant's preceding vowel entry with said first hand group.

15. The method of claim 13 wherein said first set of four binary sensors comprises four binary sensors for activation by the thumb, index, middle and ring digits of said first hand group and said first hand group comprises the left hand group.

16. The method of claim 14 wherein said second set of four binary sensors comprises four binary sensors for activation by the thumb, index, middle and ring digits of said second hand group and said second hand group comprises the right hand group.

17. The method of claim 16 further comprising the step of:

shifting into a numeric mode by activating all said four binary sensors of said second set of four binary sensors with the said thumb, index, middle and ring digits of the said second hand group.

18. The method of claim 17 wherein numbers are produced in said numeric mode on said first set of four binary sensors, from left to right, starting with the lowest and left most ring digit of the said first hand group as the lowest possible positive binary integer and progressing towards the right, producing binary numbers in a reverse binary fashion.

19. The method of claim 16 further comprising the step of:

shifting into a multifunction mode by activating the three highest possible binary value binary sensors of said second set of four binary sensors by the three highest possible positive binary integer digits, the index, middle and ring digits of the said second hand group, and then producing the binary numeric code for the specific numeric function desired by activating at least one binary sensor of said first set of four binary sensors with at least one digit of said first hand group.

20. The method of claim 13 further comprising the step of:

producing the vowel u by activating the two inner binary sensors of said first set of four binary sensors with the said middle and index digits of the said first hand group.

21. The method of claim 13 further comprising the step of:

producing the vowel y by activating the two outer binary sensors of said first set of four binary sensors with the said ring and thumb digits of the said first hand group.

22. The method of claim 14 wherein said first and second set of four binary sensors comprises an 8-dot braille cell arrangement in which said first set of four binary sensors and said second set of four binary sensors are arranged in two substantially vertical rows, where the lowest possible positive binary integer is located on the bottom of the first left set of the 8-dot braille cell, and where the highest possible positive binary integer is located on the bottom of the second right set of the 8-dot braille cell.

* * * * *